United States Patent
Wakayama et al.

(10) Patent No.: US 7,706,271 B2
(45) Date of Patent: Apr. 27, 2010

(54) METHOD OF TRANSMITTING PACKETS AND APPARATUS OF TRANSMITTING PACKETS

(75) Inventors: Koji Wakayama, Kokubunji (JP); Norihiko Moriwaki, Hino (JP)

(73) Assignee: Hitachi, Ltd., Tokyo (JP)

( * ) Notice: Subject to any disclaimer, the term of this patent is extended or adjusted under 35 U.S.C. 154(b) by 1022 days.

(21) Appl. No.: 10/617,834

(22) Filed: Jul. 14, 2003

(65) Prior Publication Data

US 2004/0136368 A1  Jul. 15, 2004

(30) Foreign Application Priority Data

Jan. 14, 2003  (JP)  ............... 2003-005237

(51) Int. Cl.
*G01R 31/08* (2006.01)
*H04L 12/28* (2006.01)

(52) U.S. Cl. ...................... 370/235; 370/392

(58) Field of Classification Search ........... 370/389, 370/229–231, 351–357, 427–429, 392, 419–421, 370/469, 235–237
See application file for complete search history.

(56) References Cited

U.S. PATENT DOCUMENTS

| | | | | |
|---|---|---|---|---|
| 6,016,310 A * | 1/2000 | Muller et al. | ............... | 370/255 |
| 6,078,943 A * | 6/2000 | Yu | ............... | 718/105 |
| 6,347,091 B1 * | 2/2002 | Wallentin et al. | ............ | 370/437 |
| 6,473,400 B1 * | 10/2002 | Manning | ............... | 370/229 |
| 6,631,484 B1 * | 10/2003 | Born | ............... | 710/305 |
| 6,771,595 B1 * | 8/2004 | Gilbert et al. | ............... | 370/229 |
| 6,819,658 B1 * | 11/2004 | Agarwal et al. | ............... | 370/316 |
| 6,987,762 B2 * | 1/2006 | Shiota | ............... | 370/389 |
| 7,027,457 B1 * | 4/2006 | Chiussi et al. | ............... | 370/414 |
| 7,263,066 B1 * | 8/2007 | Yun et al. | ............... | 370/236 |
| 7,283,538 B2 * | 10/2007 | Pham et al. | ............... | 370/401 |
| 2001/0039558 A1 * | 11/2001 | Kakisada et al. | ............ | 709/102 |
| 2001/0043611 A1 * | 11/2001 | Kadambi et al. | ............ | 370/429 |
| 2002/0181476 A1 * | 12/2002 | Badamo et al. | ............. | 370/401 |
| 2003/0012139 A1 * | 1/2003 | Fukumoto et al. | ........... | 370/235 |

(Continued)

FOREIGN PATENT DOCUMENTS

CN  1484413 A  3/2004

(Continued)

OTHER PUBLICATIONS

RFC 3032 MPLS Label Stack Encoding, Janaury 2001.

*Primary Examiner*—Seema S Rao
*Assistant Examiner*—Xavier Szewai Wong
(74) *Attorney, Agent, or Firm*—Brundidge & Stanger, P.C.

(57) ABSTRACT

On performing load balancing in a network device, there will be provided an apparatus of transmitting packets which implements uniform allocation processing in conformity with the traffic conditions. A packet transfer apparatus is provided with a statistics information collecting processor as a functional processor independent of the packet transfer processing. The line card transfers header information of packets to be transmitted and received to the statistics information collecting processor. The statistics information collecting processor collects statistics information in accordance with header information of transmitted and received packets transferred from the line card. On the basis of the statistics information collected by the statistics information collecting processor, the setting of the search table to be provided for the line card will be renewed.

12 Claims, 25 Drawing Sheets

U.S. PATENT DOCUMENTS

2003/0189932 A1* 10/2003 Ishikawa et al. ............ 370/392
2004/0042398 A1* 3/2004 Peleg et al. ................. 370/230

FOREIGN PATENT DOCUMENTS

| | | |
|---|---|---|
| JP | 03163933 A * | 7/1991 |
| JP | 09-172457 | 6/1997 |
| JP | 11-239153 | 8/1999 |
| JP | 2000-036834 | 2/2000 |
| JP | 2001-094597 | 4/2001 |
| JP | 2001160832 A * | 6/2001 |

* cited by examiner

FIG.3

| SEARCH KEY | SEARCH RESULT | | | |
|---|---|---|---|---|
| (Src IP, Dst IP) | LINE CARD | PHYSICAL PORT | DESTINATION | PRIORITY |
| (192.168.10.5, 192.168.20.2) | #1 | | | |
| (192.168.10.3, 192.168.50.3) | #2 | | | |
| (192.168.10.4, 192.168.60.6) | #1 | | | |
| | | | | |

1171 — SEARCH KEY
1172 — SEARCH RESULT
117
1174

METHOD OF TRANSMITTING PACKETS AND APPARATUS OF TRANSMITTING PACKETS

BACKGROUND OF THE INVENTION

1. Field of the Invention

The present invention relates to an apparatus of transmitting packets, and more particularly to a statistics information collection method and a load balancing method.

2. Description of Related Art

Due to advanced communication service using Internet such as electronic commerce and video distribution, an increase in an amount of traffic and speedup of communication speed have been rapidly advancing. In keeping with these, the throughput of communication apparatuses such as routers and servers within the network has been becoming further higher. For this reason, it has become a pressing need to improve the throughput of the communication apparatuses. In, for example, the WWW (World Wide Web) service, access to specified servers has increased, and in order to cover the processing with a single server, there arise cases where the capacity is insufficient.

Also, in order to implement Virtual Private Network (VPN) service using Internet, it is necessary to perform higher layer processing to be performed in units of packets to be transmitted and received in conformity with the communication speed. As the higher layer processing, there are named encryption, firewall processing and the like.

As regards the packet transfer method, there have been proposed various methods. There are, for example, transfer using Ethernet (registered trademark) frame stipulated by IEEE802.3, transfer using Tag VLAN stipulated by IEEE802.1Q, transfer using MPLS (Multi-Protocol Label Switching) stipulated by IETF RFC3032, and transfer using RPR (Resilient Packet Ring) that is being standardized by the IEEE802.17 committee. These are all packet transfer methods using Ethernet, and in addition, there are various packet transfer methods depending upon the communication method.

As one of techniques for improving the processing capacity of the communication apparatus, there is a load balancing technique. The load balancing technique is a method of reducing the throughput of each single apparatus and improving the processing capacity as a whole by providing a plurality of apparatuses, each having the same function and allotting a portion of the processing to each among these apparatuses.

Through the use of the load balancing technique, it becomes possible to improve fault tolerance in addition to the improvement of the processing capacity. In other words, even when one of those apparatuses suffers a breakdown, the remaining apparatuses take over the processing for thereby making it possible to continue the operation.

The load balancing is divided into load balancing aimed at distributing the throughput within the apparatus and load balancing aimed at distributing the throughput of other apparatuses (for example, server) connected to the apparatus.

In order to implement the load balancing, it is necessary to properly allocate packets to a plurality of apparatuses targeted for the load balancing for transferring.

As a first method for implementing allocation of packets, there is a method using Round Robin. The method using Round Robin is a method for allocating the packets to apparatuses different from one another in the order received.

As a second method for implementing allocation of packets, there is a method of allocating packets in accordance with a hash value in the header information. The method using the hash value is a method to determine an allocation target of the packet in accordance with a value (hash value) obtained by calculating a hash function with header information representing a flow, for example, a pair of a source IP address and destination IP address of the packet as an argument.

As a third method for implementing allocation of packets, there is a method using a filtering table. The method using the filtering table is a method to prepare for a flow and a table for bringing a packet of the flow into correspondence with the allocation target in advance, and to determine the allocation target of the packet by retrieving the table with information representing the flow indicated on the packet header as the search key on receipt of the packet.

In the packet allocation using the round robin, it is possible to comparatively uniformly distribute the packets to the allocation targets because they are allocated in the order of arrival of the packets. Since, however, there may occur a difference in time required for processing such as delay time due to packet transfer, the problem is that the order of packets which an apparatus targeted for the load balancing has received may be different from the order of packets which the aforementioned load balancing target transmits in the same flow (for example, a pair of source address and destination address) which poses a problem. As a method of solving the aforementioned problem, there is a method in which a sequence number is imparted to an internal header to be imparted to a packet when the packet is received, and the packet is transmitted in the order of the sequence number when the packet is transmitted. When, however, a number of flows increases, processing of sequence number management becomes complicated, which poses a problem.

In the method using the hash value, since the hash value becomes the same in the same flow, the packets are to be transmitted in the order of the packets received in the same flow. When there are many specified flows, however, the method using the hash value has a problem that the packets may not always be uniformly allocated.

In the method using the filtering table, it is necessary to register a flow in advance. Also, with fluctuations in traffic pattern for each flow, there is a possibility that the packet allocation targets are one-sided, which poses a problem.

SUMMARY OF THE INVENTION

It is thus an object of the present invention to implement uniform allocation in response to the actual traffic conditions.

In the present invention, in order to implement uniform allocation in proportion to actual traffic conditions, statistics information on an amount of packets will be utilized. The traffic conditions of the apparatus can be grasped by counting the amount of packets which pass through an interface. Also, when transferring the packets within the apparatus, the statistics information can be collected by adding up a number of packets and a number of bytes, and recording header information imparted to the packets.

Also, since a format of header information imparted to the packet differs with the packet transfer method, it becomes necessary to perform statistics information collecting processing depending on the packet transfer method in the router. Further, items of the statistics information to be collected differ with the portion applied and the like of the apparatus. Therefore, in order to collect statistics information corresponding to diverse packet transfer methods, processing in the router becomes complicated, which poses a problem.

Thus, according to the present invention, there is provided a functional module for the exclusive use aimed at collecting statistics information. A line interface for transmitting and receiving packets transfers header information imparted to the packet to the functional module for collecting the statistics information. Thereby, the packet transfer processing and the statistics information collecting processing are performed by an independent functional module.

By transferring packets in this manner, it becomes possible to implement the statistics information collecting processing corresponding to diverse packet transfer methods, and to implement a high-speed, and high-functional apparatus of transmitting packets.

Specifically, within the apparatus of transmitting packets, there are provided means for performing load balancing of packets, means for counting packets which pass through the interface, and a statistics information collecting processor for performing statistical processing of packets counted to predict an amount of packets to be received by the interface. The load balancing means performs load balancing control on the basis of traffic of interface predicted.

BRIEF DESCRIPTION OF THE DRAWINGS

FIG. 3 is a view showing an example of the structure of a search table to be provided in a line card in an apparatus of transmitting packets according to the present invention;

DETAILED DESCRIPTION OF THE PREFERRED EMBODIMENTS

Hereinafter, with reference to the drawings, the description will be made of embodiments of the invention.

Figure 6:
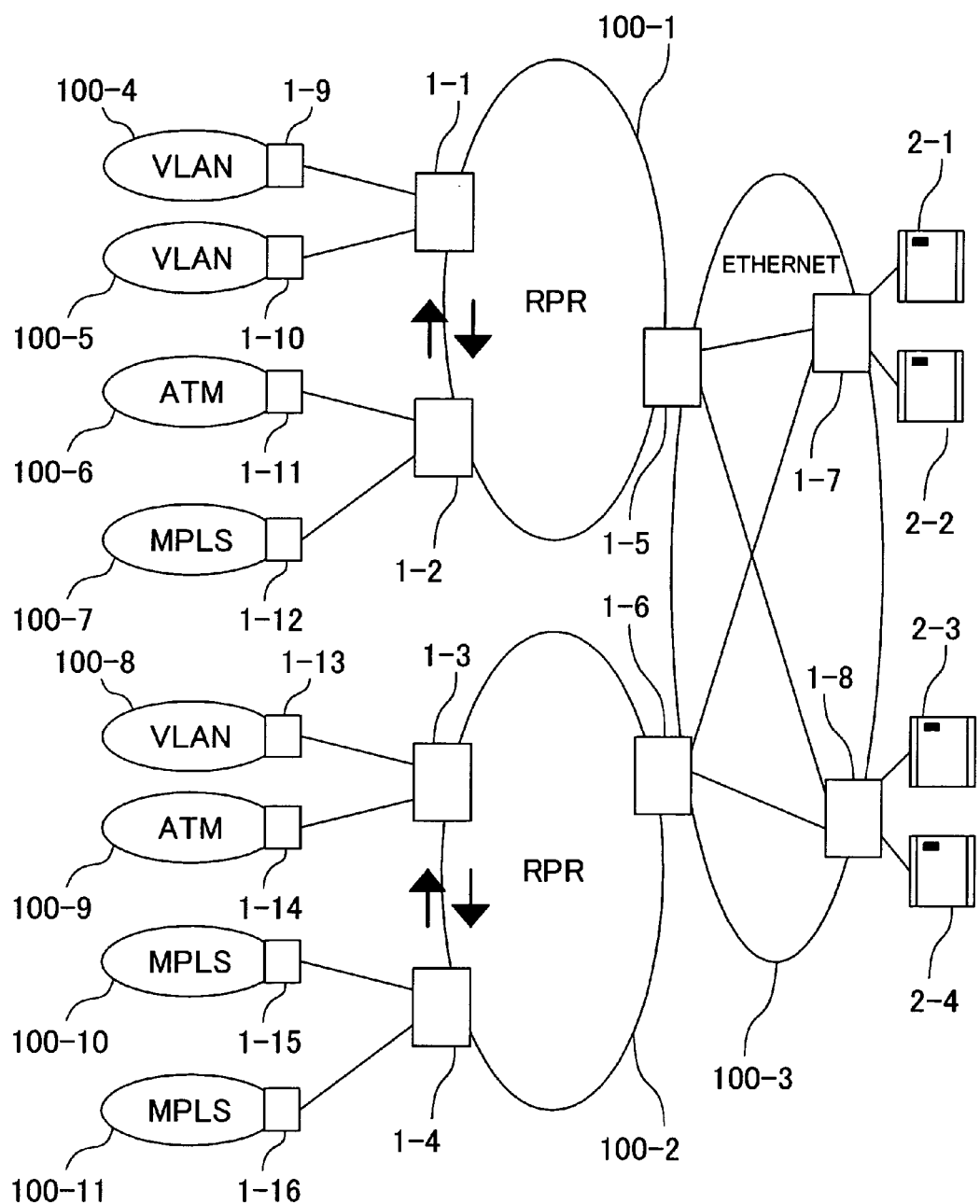
FIG. 6 is a view showing an example of the structure of a network to which the apparatus of transmitting packets according to the present invention is applied.

FIG. 6 shows an example of the network in which the apparatuses of transmitting packets according to the present invention.

In the example of FIG. 6, networks 100-1 to 100-11 are constructed of the apparatuses of transmitting packets 1-1 to 1-16 and servers 2-1 to 2-4. In the networks 100-1 and 100-2, packets are transferred by RPR. In the network 100-3, packets are transferred by Ethernet. In the networks 100-4, 100-5 and 100-8, packets are transferred by VLAN. In the networks 100-6 and 100-9, packets are transferred by ATM (Asynchronous Transfer Mode). In the networks 100-7, 100-10 and 100-11, packets are transferred by MPLS.

Figure 1:
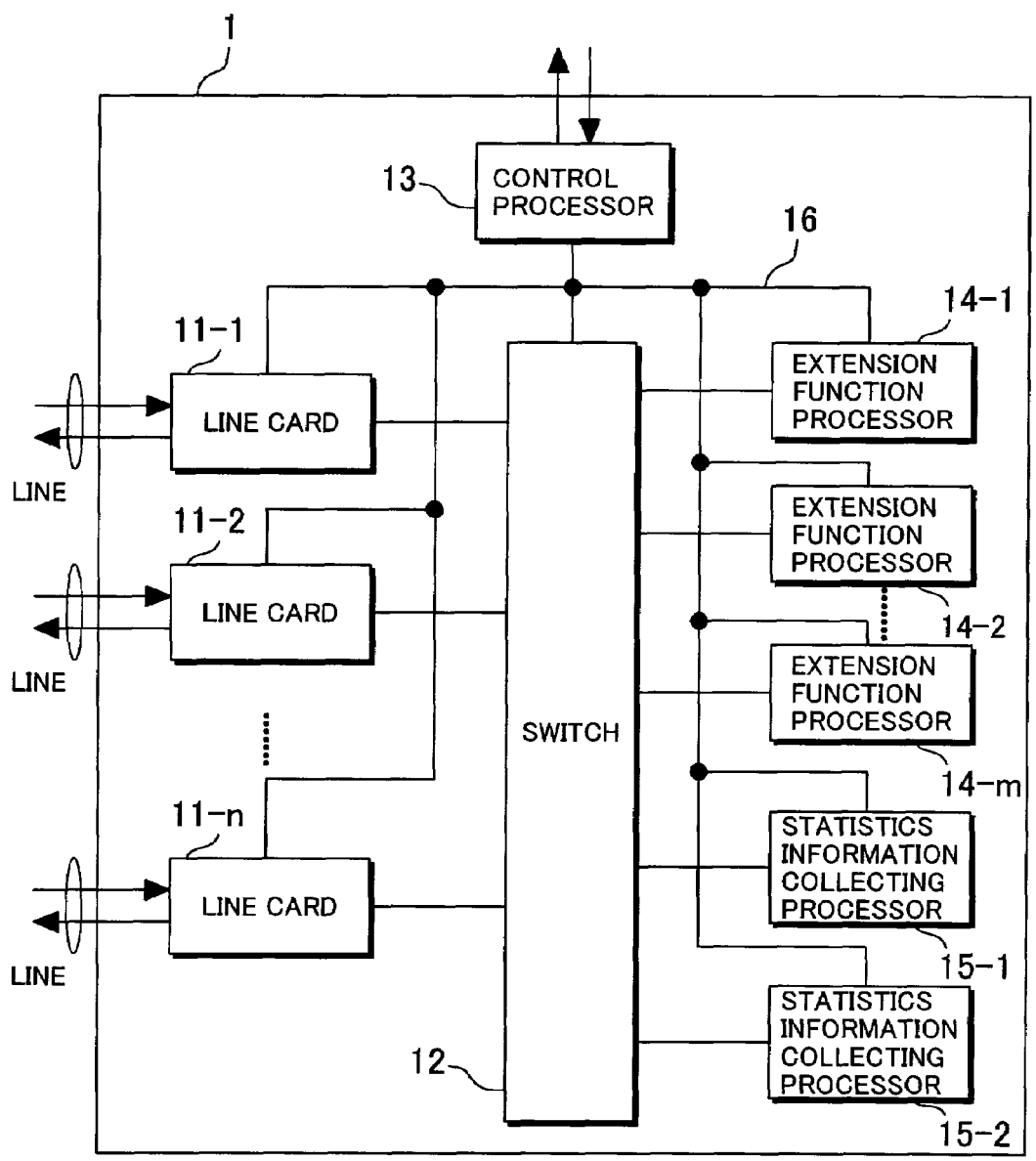
FIG. 1 is a view showing an example of the structure of an apparatus of transmitting packets according to the present invention.

FIG. 1 shows an example of the structure of the apparatus of transmitting packets according to the present invention. The apparatus of transmitting packets 1 is constructed of: a line card 11 for termination of lines and packet transfer processing; a switch 12 for switching the packet; a control processor 13 for controlling the apparatus; an extension function processor 14 for performing higher layer processing such as encryption processing; a statistics information collecting processor 15 for collecting statistics information; and an internal bus 16 for connecting a control processor 13 to the line card 11, the switch 12 and the extension function processor 14, for transferring signals for controlling within the apparatus.

As a method of transferring signals to be transferred between the line card 11 and the statistics information collecting processor 15, there is named a method of going through the switch 12 or a method of going through the bus 16. Which method is more appropriate to be used differs with switching capacity of the switch 12, transfer capacity of the bus 16, or an amount of information and the like of control messages within the apparatus. Since, however, the control signals flow without going through the switch by transferring the signals through the bus, it is possible to prevent the switching capability due to transfer of control signals from being deteriorated even when traffic of packets to be transmitted and received by the apparatus of transmitting packets 1 is in an overloaded state.

With reference to FIG. 1, the description will be made of a flow of packet processing in the apparatus of transmitting packets 1. The line card 11 retrieves header information of the packet received to thereby determine to which line card 11 or extension function processor 14 within the apparatus of transmitting packets the packet should be transferred, and imparts an internal header indicating the destination of the packet to the packet to transfer to the switch 12. By referring to the information of the internal header imparted to the packet, the switch 12 switches the packet to the appropriate line card 11 or extension function processor 14. The line card 11 encapsulates the packet switched by the switch 12 in order to send out the packet to the line. Also, when the packet is switched to the extention function processor 14, the extention function processor 14 performs higher layer processing such as the encryption processing to the packet.

Figure 21:
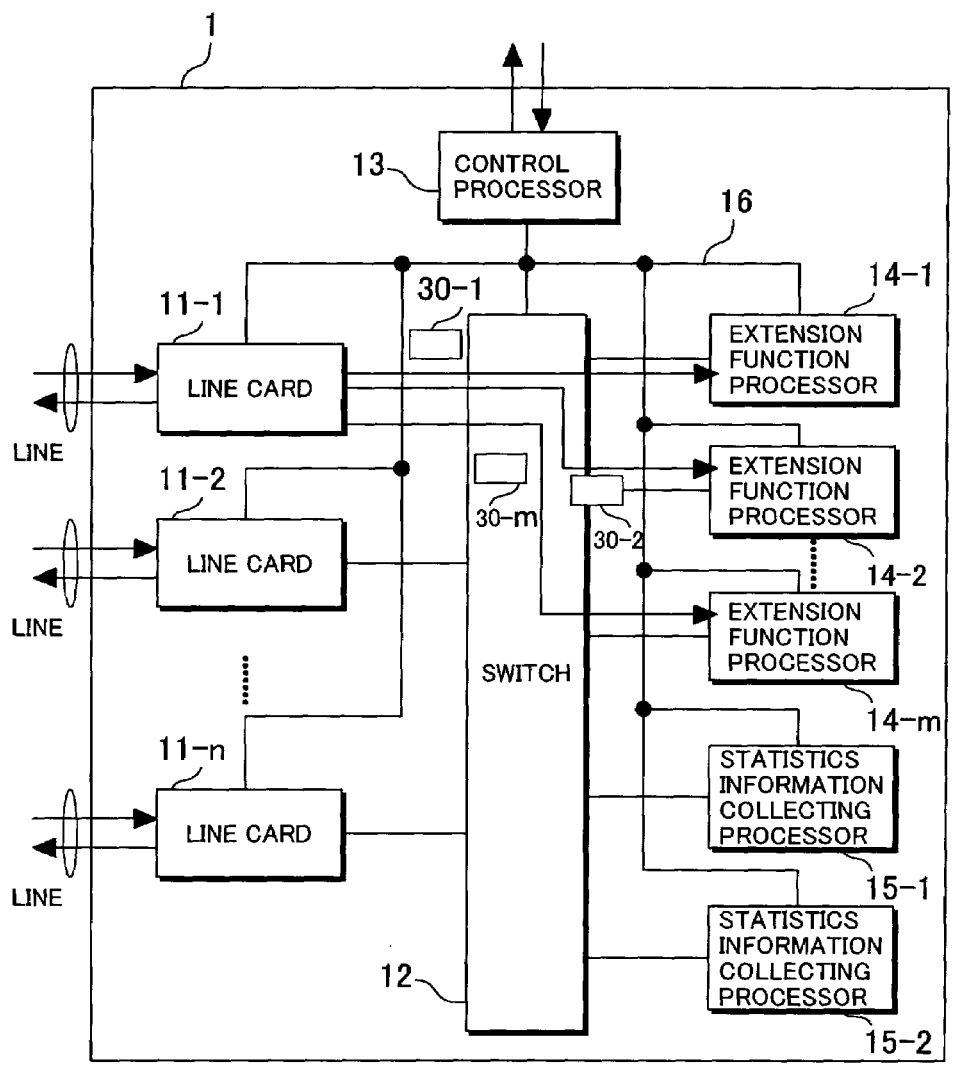
FIG. 21 is a view showing an example of load balancing in an apparatus of transmitting packets according to the present invention.

A first example of the load balancing processing that the apparatus of transmitting packets according to the present invention performs is the processing in which the packets 30-1 to 30-m are allocated to the extension function processors 14-1 to 14-m respectively from the line card 11-1 because the processing load is distributed to the extension function processors 14-1 to 14-m when performing the higher layer processing to such packets received by the line card 11-1 as shown in FIG. 21. In the present embodiment, the packet is received, the destination of the packet will be determined on the basis of the destination address imparted to the received packet to transmit the packet. Such processing is defined as basic packet transfer processing. The processing to be taken up by an upper layer than the layer to be taken up by the basic packet transfer processing is defined as a higher layer processing.

A second example of the load balancing processing that the apparatus of transmitting packets according to the present invention performs is a packet allocation processing to a server 2-1 or server 2-2 by the apparatus of transmitting packets 1-7 of FIG. 6, or packet allocation processing to a server 2-3 or server 2-4 by the apparatus of transmitting packets 1-8. In the second example of the load balancing processing, this is synonymous with processing of allocating packets to the line card connected to the server.

Figure 2:
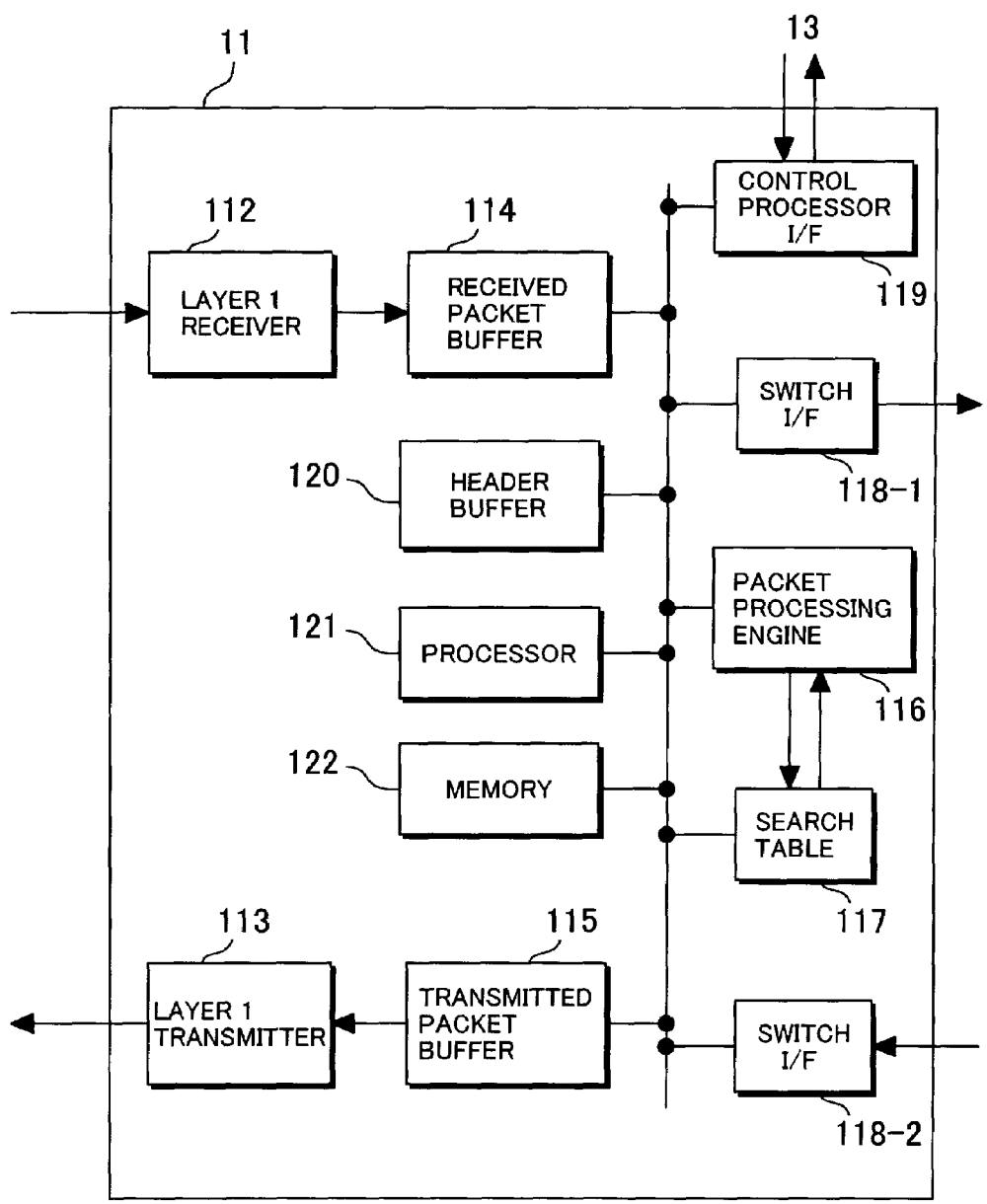
FIG. 2 is a view showing an example of the structure of a line card in an apparatus of transmitting packets according to the present invention.

FIG. 2 shows an example of the structure of the line card 11 in the apparatus of transmitting packets shown in FIG. 1.

The line card 11 is constructed of: a layer 1 receiver 112 for termination of a physical layer of a received packet; a layer 1 transmitter 113 for termination of a physical layer of a transmitted packet; a received packet buffer 114 for buffering the received packet; a transmitted packet buffer 115 for buffering the transmitted packet; a packet processing engine 116 for performing determination of the destination of the packet and encapsulation processing of the packet, that is, imparting a header to the packet during transferring; a search table 117 in which the packet processing engine 116 stores header information imparted to the packet and information concerning correspondence relationship of processing of the packet; a switch interface 118, which is an interface with the switch; a control processor interface 119, which is a communication interface with the control processor; a header buffer 120 for storing header information that is imparted to the transmitted and received packets; a processor 121; and a memory 122. The search table 117 may be stored in the memory 122.

With reference to FIG. 2, the description will be made of a method of processing a received packet in the line card 11. In the layer 1 receiver 112, the physical layer processing such as optical-electrical transformation is performed to buffer the packet by the received packet buffer 114. In the packet processing engine 116, the search table 117 is retrieved with header information of the received packet as a key to determine the destination of the packet and perform the header encapsulation processing. When transferring it to another line card or the extension function processor, the packet will be sent out from a switch interface 118-1 to the switch 12. Also, when receiving a packet from the switch 12 through a switch interface 118-2, the packet will be first buffered to a transmitted packet buffer 115. Next, the packet processing engine 116 retrieves the search table 117 with information of the internal header imparted to the head of the packet as a key to perform the encapsulation processing in order to send out the packet from the line. In the layer 1 transmitter 113, the physical layer processing such as electrical-optical transformation is performed to send out the packet to the line.

Also, the packet processing engine 116 extracts the header information imparted to the packet to buffer in a header buffer 120 and to count the length of the packet at the same time.

Figure 7:
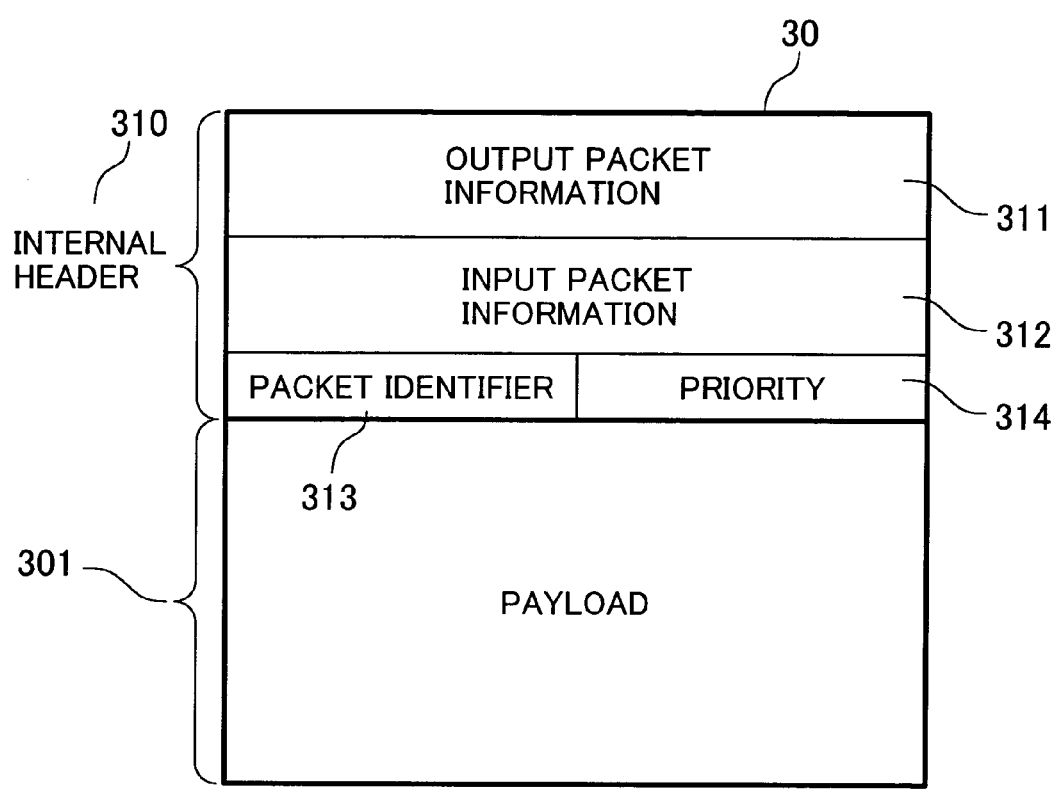
FIG. 7 is a view showing an example of a format when a packet is transferred, in the apparatus of transmitting packets according to the present invention, from a line card through a switch within the apparatus.

FIG. 7 shows an example of a format when the packet is transferred from the line card 11 on the reception side to the line card 11 on the transmission side through the switch 12. The line card 11 imparts an internal header 310 for setting information required to transfer the packet within the apparatus to the head of a packet 301 to be transferred from the line card 11 on the reception side to the line card 11 on the transmission side. To the internal header 310, there is set information required to transmit the packet from the apparatus of transmitting packets 1—that is, a line card number, a physical port number on the transmission side, a line type of the physical port on the transmission side, and packet output information 311 for setting an IP (Internet Protocol) address of an apparatus at the destination from the apparatus of transmitting packets 1—and information concerning the line card 11 on the reception side—that is, a line card number on the reception side, a number of the physical port which has received the packet, packet input information 312 for setting a line type of the physical port which has received the packet, a packet identifier 313 indicating a packet type such as whether the packet is an user data packet or a packet of the internal control signal, and transfer priority 314 of packets within the apparatus. Set points for the packet output information 311 and the priority 314 will be determined on the basis of the search result of the search table 117 in the line card 11.

FIG. 3 is a view showing an example of the structure of the search table 117. The search table 117 is provided with an entry 1173 representing the relationship of correspondence between the search key 1171 and the search result 1172. In the example of FIG. 3, a pair of source IP address of the packet and destination IP address of the packet is used as the search key.

Figure 4:
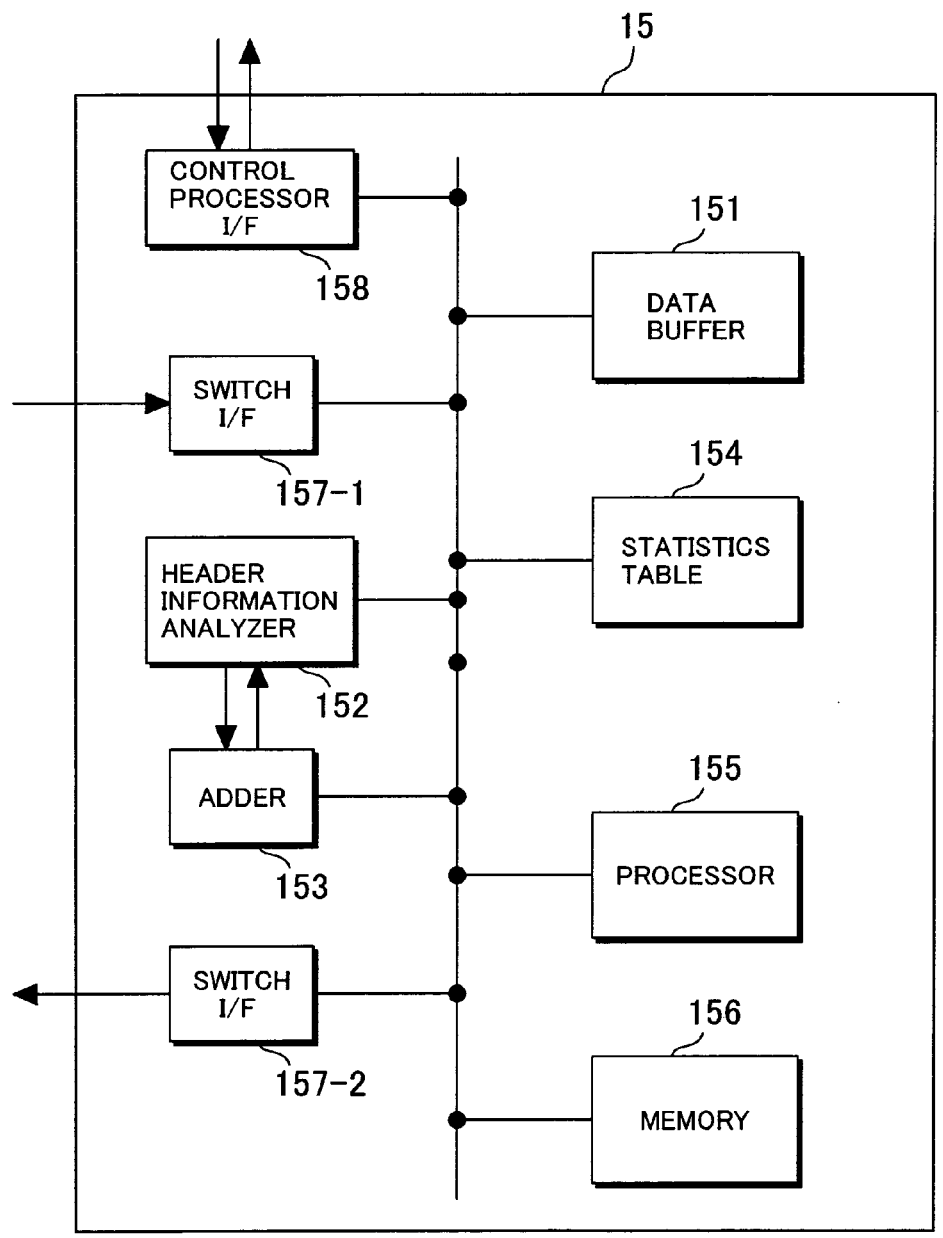
FIG. 4 is a view showing an example of the structure of a statistics information collecting processor in an apparatus of transmitting packets according to the present invention.

FIG. 4 is a view showing an example of the structure of a statistics information collecting processor in an apparatus of transmitting packets according to the present invention. The statistics information collecting processor 15 is constructed of: a data buffer 151 for storing a frame for header transfer transferred from the line card; a header information analyzer 152 (means for analyzing header information) for performing header information analysis in order to collect statistics information; an adder 153 (means for counting an amount of packets) for calculating an amount of packets for each flow, for example, a number of packets, a number of bytes and a number of bits, of packets received by the apparatus of transmitting packets 1; a statistics table 154 for storing statistics information obtained by counting by the adder; a processor 155 for controlling the statistics information collecting processor 15 and renewing the table; a memory 156, which is a processor program area; a switch interface 157 which is an interface with the switch; a control processor interface 158, which is a communication interface with the control processor; and the like.

Figure 8:
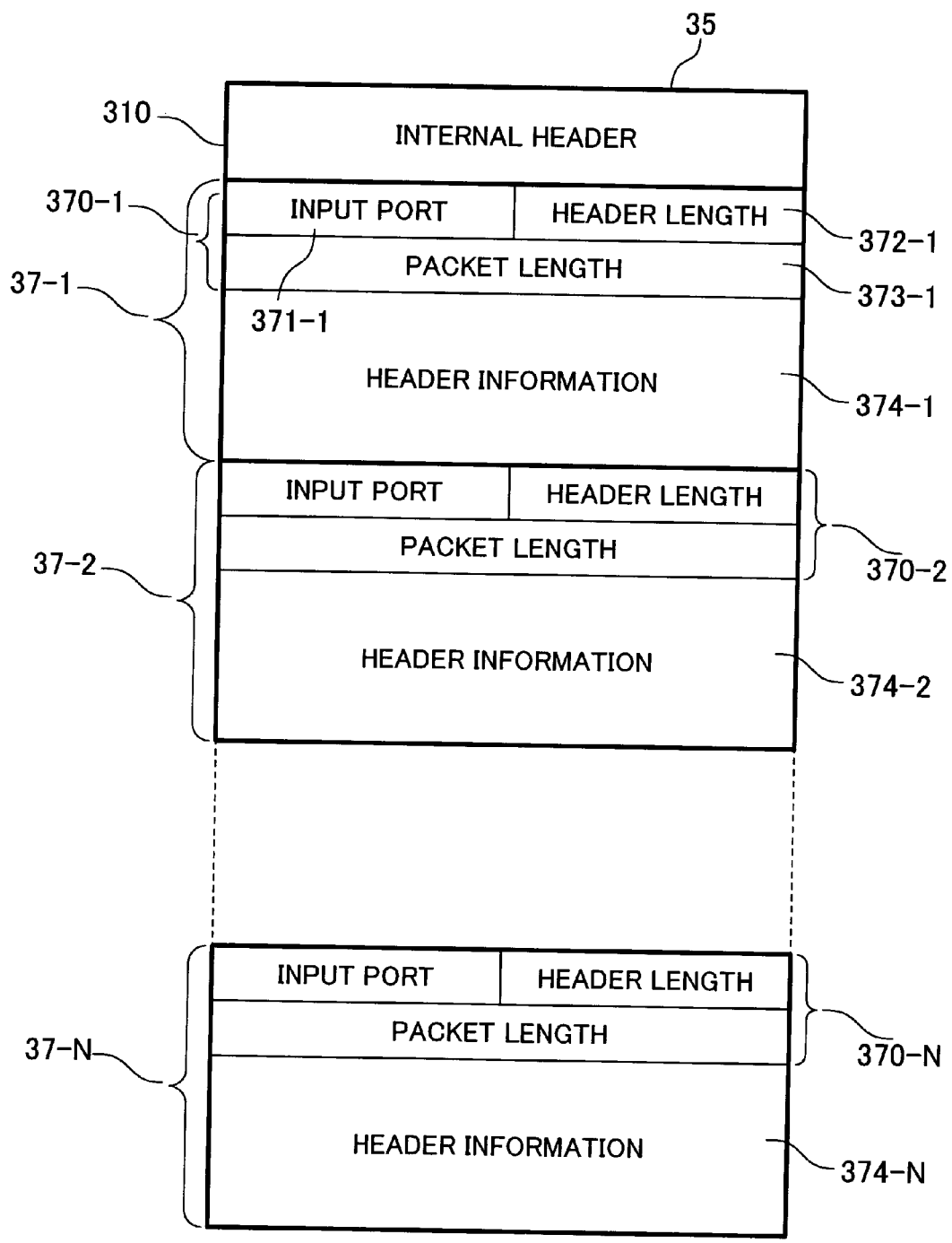
FIG. 8 is a view showing an example of a frame format when header information of the packet which the line card receives is transferred, in the apparatus of transmitting packets according to the present invention, from the line card to the statistics information collecting processor.

FIG. 8 shows an example of format of a frame for header transfer when a frame obtained by multiplexing header information of a plurality of packets is generated in the line card and is transferred to the statistics information collecting processor as an example of a method of transferring the header information from the line card to the statistics information collecting processor. The frame for header transfer 35 is constructed of: the internal header 310 shown in FIG. 7; and a header area 37.

The line card 11 designates the statistics information collecting processor 15 as the destination of the frame 35 through the use of the packet output information of the internal header 310.

The header area 37 is constructed of: an input port 371 of the packet to which the header has been imparted; a packet information processor 370 for setting length 372 of the header and length 373 of the packet to which the header has been imparted; and header information 374.

The length of the header information 374 may be made into fixed length irrespective of the packet transfer method in the line. Also, the length of the header information 374 may be made into variable length in accordance with the packet transfer method in the line. In one header transfer frame 35, header areas 37-1 to 37-n of N pieces of packets are stored.

As shown in the example of FIG. 8, a plurality of header areas for packets are stored in one frame for header transfer for transferring, in other words, the header information is multiplexed for being transferred, whereby it is possible to cut down overhead associated with the transfer of the header information from the line card 11 to the statistics information collecting processor 15.

With reference to FIG. 4, the description will be made of the statistics information collecting processing in the statistics information collecting processor.

The frame for header transfer 35 transferred from the line card 11 is stored in the data buffer 151 through a switch interface 157-1. The header information analyzer 152 extracts individual header areas of header areas 37-1 to 37-N within the frame of header transfer 35 from the data buffer 157-1. Further, the header information analyzer 152 reads out, concerning the respective header areas 37-1 to 37-N, flow information to be collected as statistics information such as packet length set to the respective packet information processors 370-1 to 370-N, source address and destination address that have been set to the respective header information 374-1 to 374-N. The adder 153 holds a register for adding a number of packets, a number of bytes and a number of bits for each flow extracted at the header information analyzer. The number of packets, the number of bytes and the number of bits which have been written on the register of the adder 153 are written in the statistics table 154 every a fixed time period.

Figure 5:
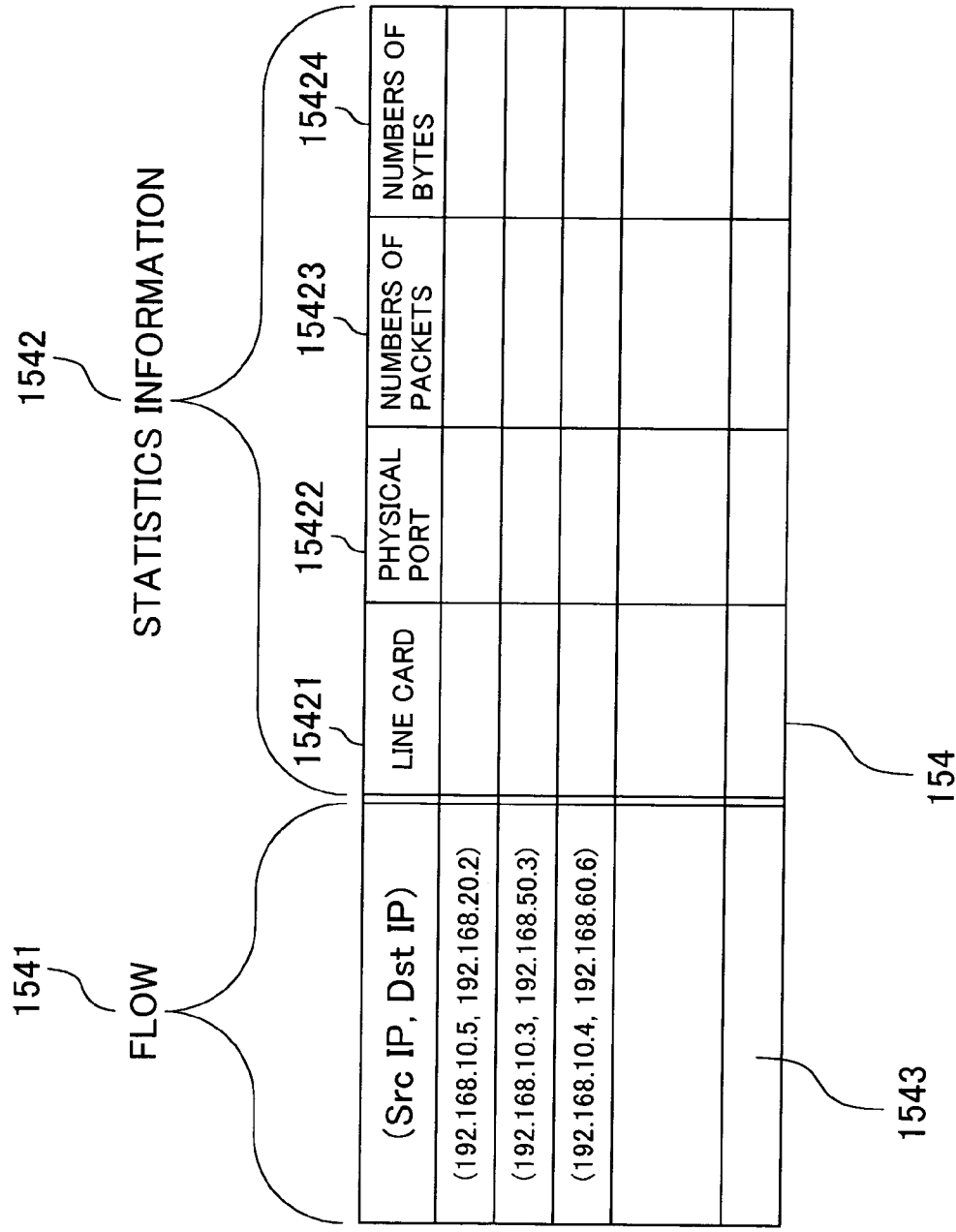
FIG. 5 is a view showing an example of the structure of a statistics table in an apparatus of transmitting packets according to the present invention.

FIG. 5 shows an example of the structure of the statistics table 154 to be provided at the statistics information collecting processor 15. The statistics table 154 is provided with an entry 1543 which is constructed of: a field 1541 for setting a flow; and a field 1542 on which the statistics information in the flow is recorded. In the example of the statistics table 154 of FIG. 5, the source IP address and the destination IP address of the packet are made into a pair as a flow 1541. Also, as items of statistics information to be collected, there are discrimination information 15421 of an input line card of the flow; discrimination information 15422 of input physical port; total number 15423 of packets; and total number 15424 of bytes of the packets.

Figure 22:
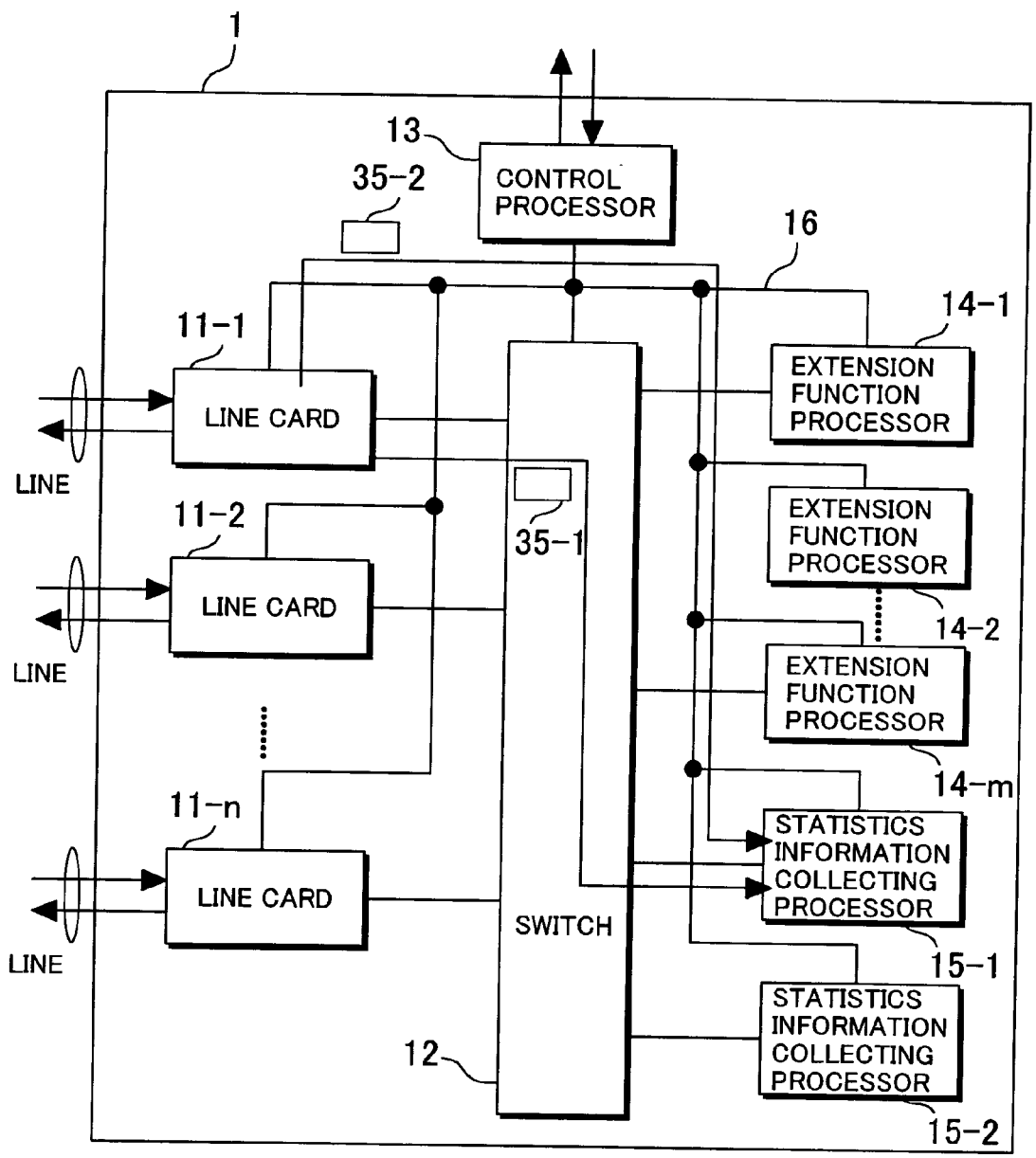
FIG. 22 is a view showing an example of a method of transferring header information in an apparatus of transmitting packets according to the present invention.

In this respect, in the embodiments to this point, the description has been made of one example of the structure of the statistics information collecting processor when the header information is transferred from the line card 11 to the statistics information collecting processor 15 through the switch 12 like the frame for header transfer 35-1 in FIG. 22. The header information can be also transferred from the line card 11 to the statistics information collecting processor 15 through the internal bus 16 like the frame 35-2 in FIG. 22. When transferring the header information from the line card 11 to the statistics information collecting processor 15 through the internal bus 16, the statistics information collecting processor transmits and receives the header information with the internal bus 16 through the control processor interface 158.

Figure 10:
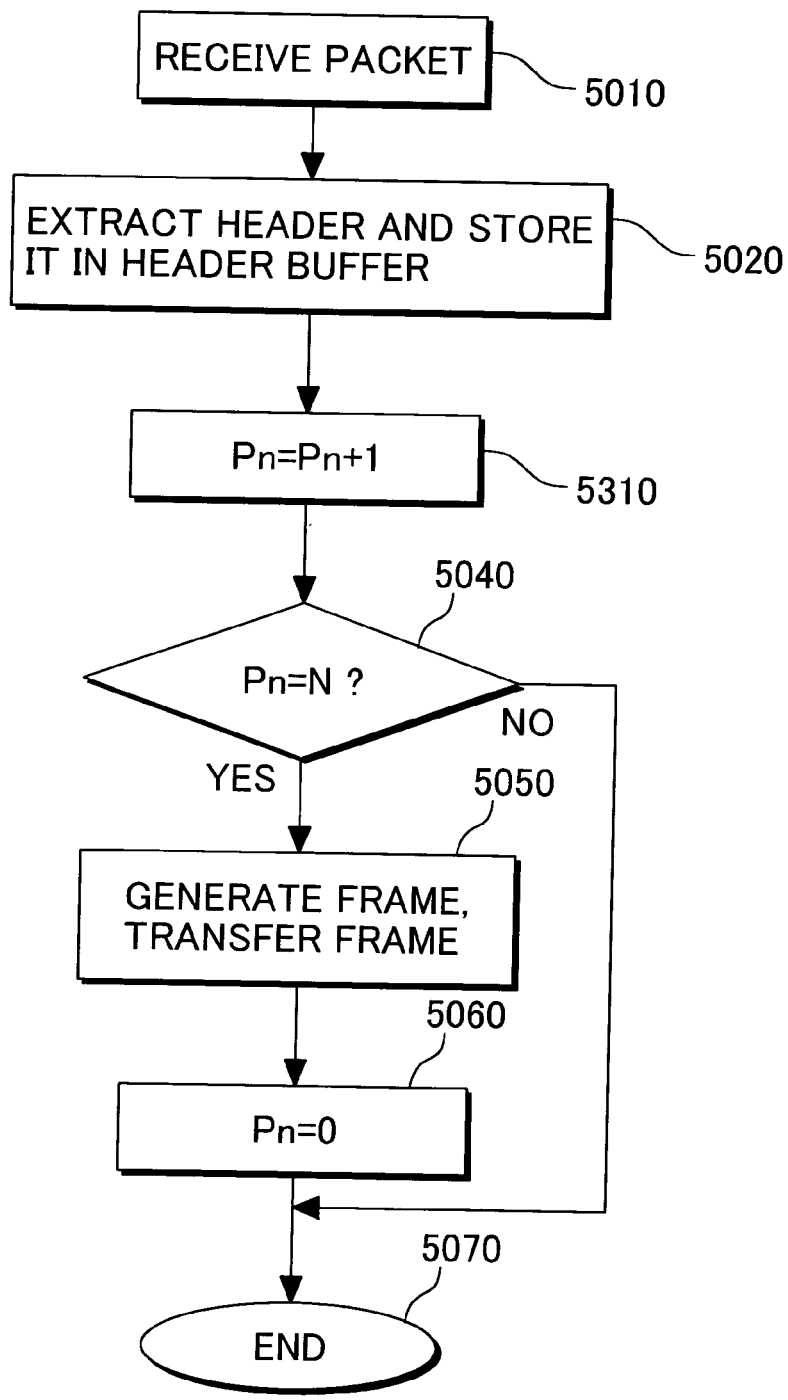
FIG. 10 is a flowchart showing an example of the procedure when header information of the packet which the line card receives is, in the line card of the apparatus of transmitting packets according to the present invention, transferred to the statistics information collecting processor.

FIG. 10 shows a flowchart of the processing in the line card 11 when transferring the header information to the statistics information collecting processor 15 through the use of the frame for header transfer 35 shown in FIG. 8.

When the line card 11 receives (Step 5010) a packet from the line, the packet processing engine 116 extracts the header portion of the packet buffered into a received packet buffer 114 to store in a header buffer 120 (Step 5020). The packet processing engine 116 holds a packet counter for adding a number of packets processed by the packet processing engine 116. The packet processing engine 116 increases a value Pn of the packet counter by 1 (Step 5030). At this time, it is judged whether or not the value Pn of the packet counter coincides with a predetermined value N (N is an integer of 2 or higher) (Step 5040). If the value Pn of the packet counter is equal to N, the frame for header transfer 35 shown in FIG. 4 will be generated to transfer to the statistics information collecting processor 15 (Step 5050). At the same time, the value Pn of the packet counter will be reset (Step 5060) to complete the processing (Step 5070). If the value Pn of the packet counter is not equal to N in the Step 5040, the processing will be completed (Step 5070).

Figure 9:
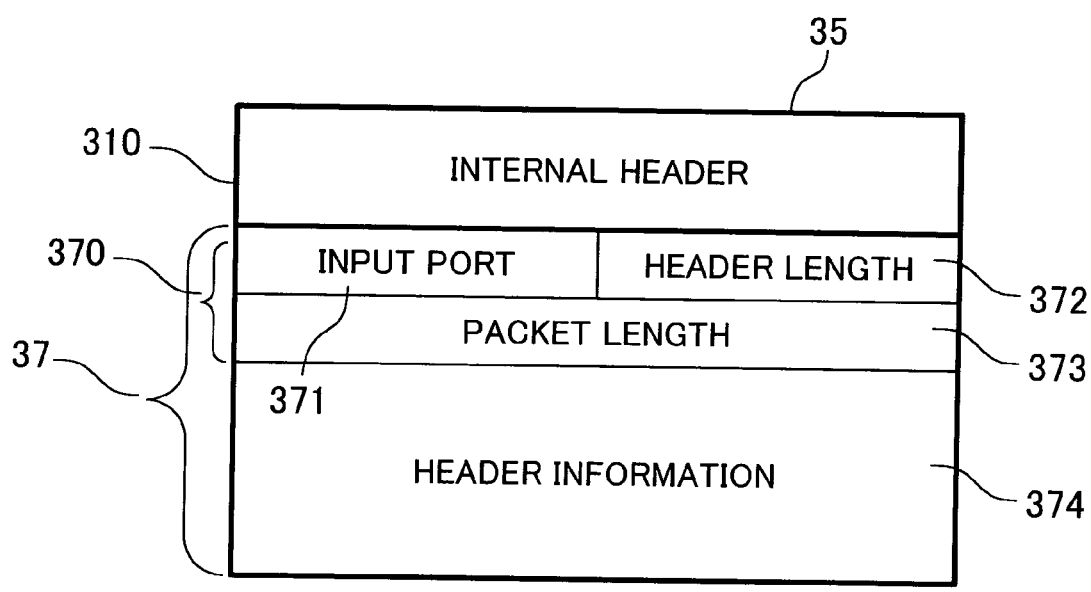
FIG. 9 is a view showing an example of a frame format when header information of the packet which the line card receives is transferred, in the apparatus of transmitting packets according to the present invention, from the line card to the statistics information collecting processor.

In this respect, when transferring header information of the received packet from the line card 11 to the statistics information collecting processor 15, the header information of a single packet may be transferred with one frame as shown in FIG. 9. When transferring the header information of a single packet with one frame, the processing in the Step 5050 is performed after the processing in the Step 5020 in the flowchart of FIG. 10, whereby the header information will be notified to the statistics information collecting processor 15 from the line card 11.

In the description to this point, there has been shown the embodiment when the processing of transferring the header information is performed for the packet received by the apparatus of transmitting packets 1. It is also possible to perform the header transferring processing for a packet to be transmitted by the apparatus of transmitting packets 1. When performing the header transferring processing for the packet to be transmitted by the apparatus of transmitting packets 1, the packet transferred from the switch 12 to the line card 11 is to be received in the Step 5010 of the flowchart of FIG. 10.

The description will be made of an example of a format of the packet to be processed by the apparatus of transmitting packets 1.

Figure 12:
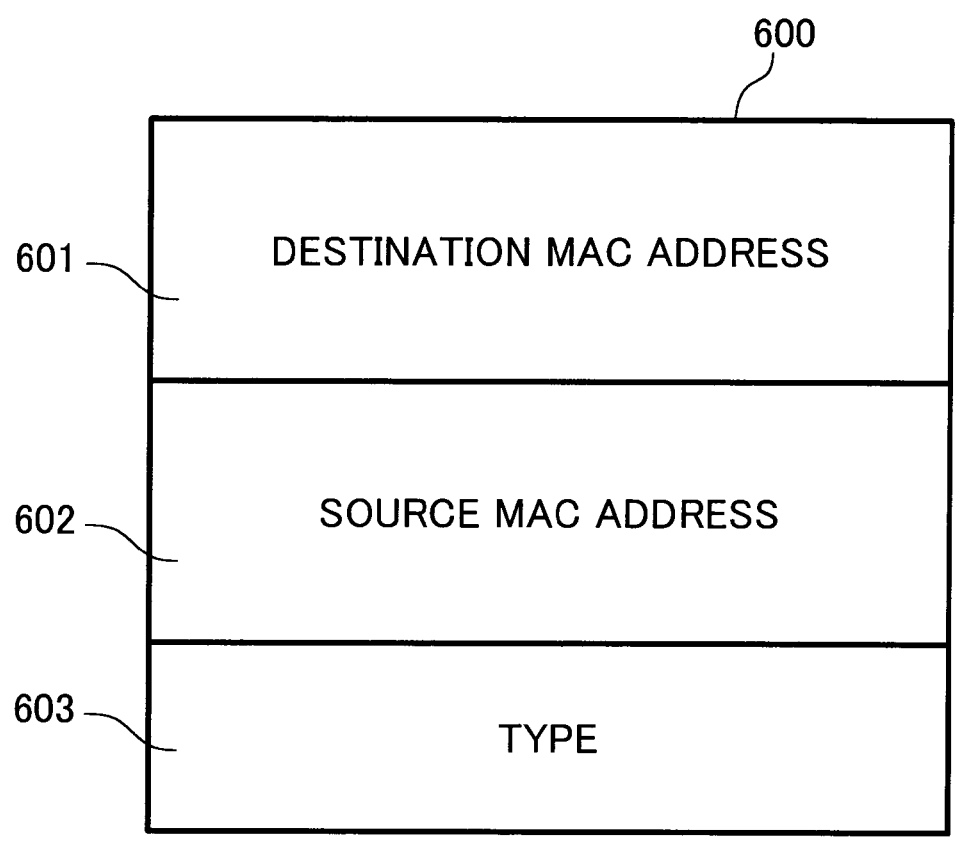
FIG. 12 is a view showing a format of an Ethernet header.

FIG. 12 shows the format of an Ethernet header. The Ethernet header 600 is constructed of: a destination MAC address 601; a source MAC address 602; and a type field 603 representing an encapsulation type.

Upper layer protocol of a packet encapsulated in the Ethernet header can be distinguished by the value of the type field 603 of the Ethernet header 600.

Figure 13:
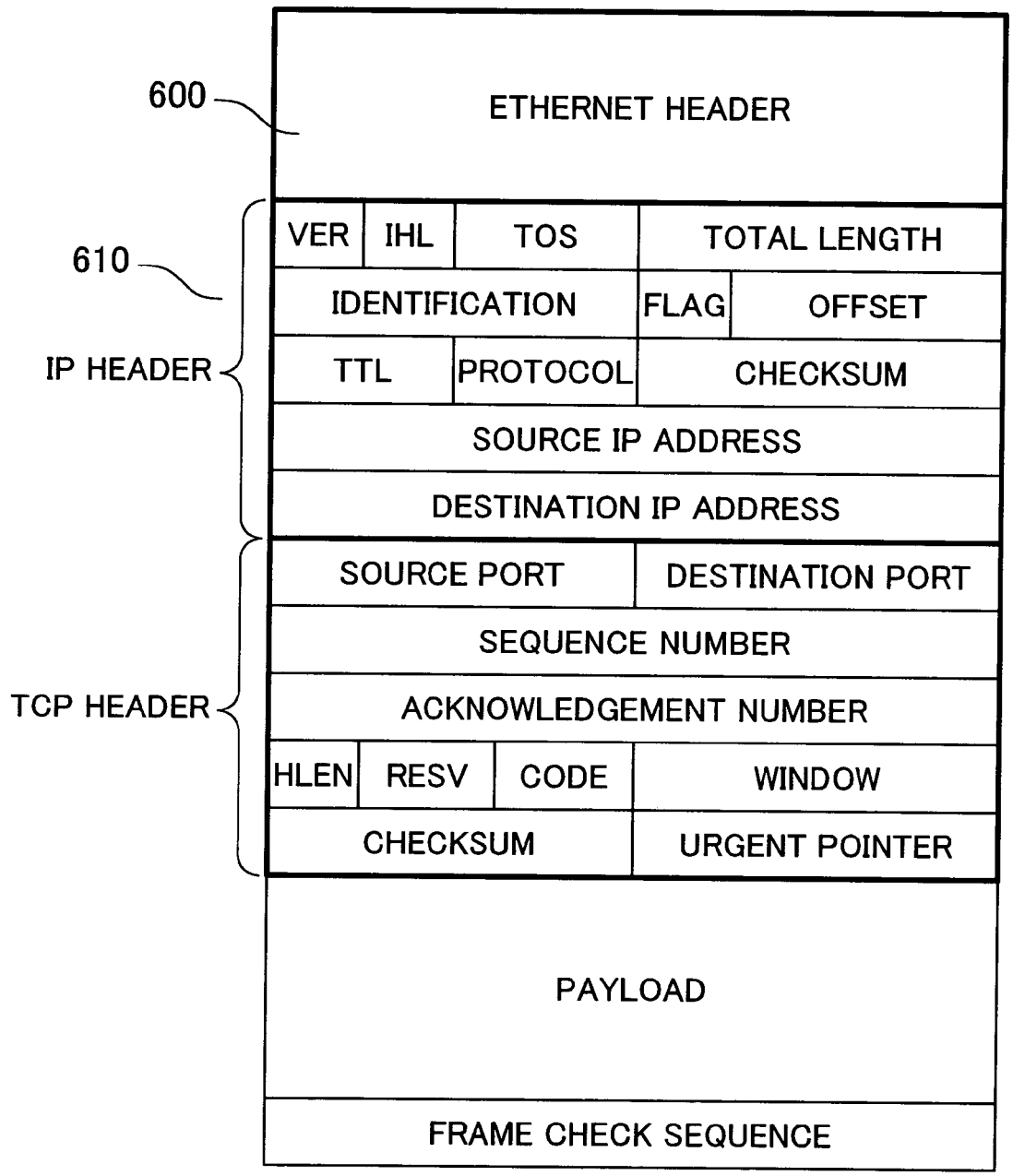
FIG. 13 is a view showing formats of an IP header and a TCP header.

FIG. 13 shows a format of the IP packet encapsulated by the Ethernet header. When the Ethernet header encapsulates the IP packet, a value 800 of a hexadecimal digit is set to the type field 603 of the Ethernet header 600. Thereby, it can be recognized that an IP header 610 has been set behind the Ethernet header 600.

Figure 14:
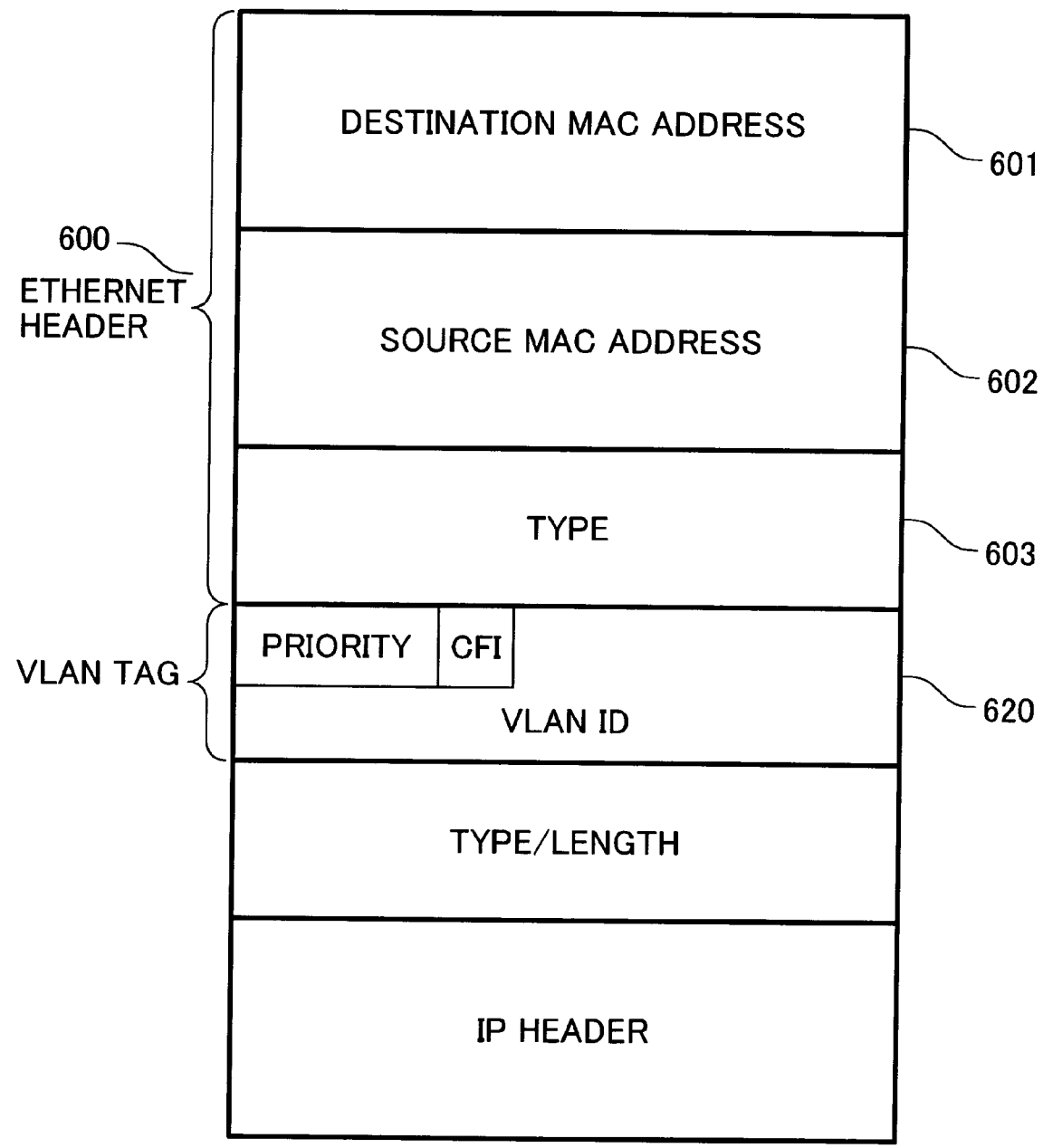
FIG. 14 is a view showing a VLAN frame format.

FIG. 14 is a view showing a Tag VLAN packet format stipulated by IEEE802.1Q. When a value 8100 of a hexadecimal digit has been set to the type field 603 of the Ethernet header 60, it can be recognized that VLAN Tag 620 has been set behind the Ethernet header 600.

Figure 15:
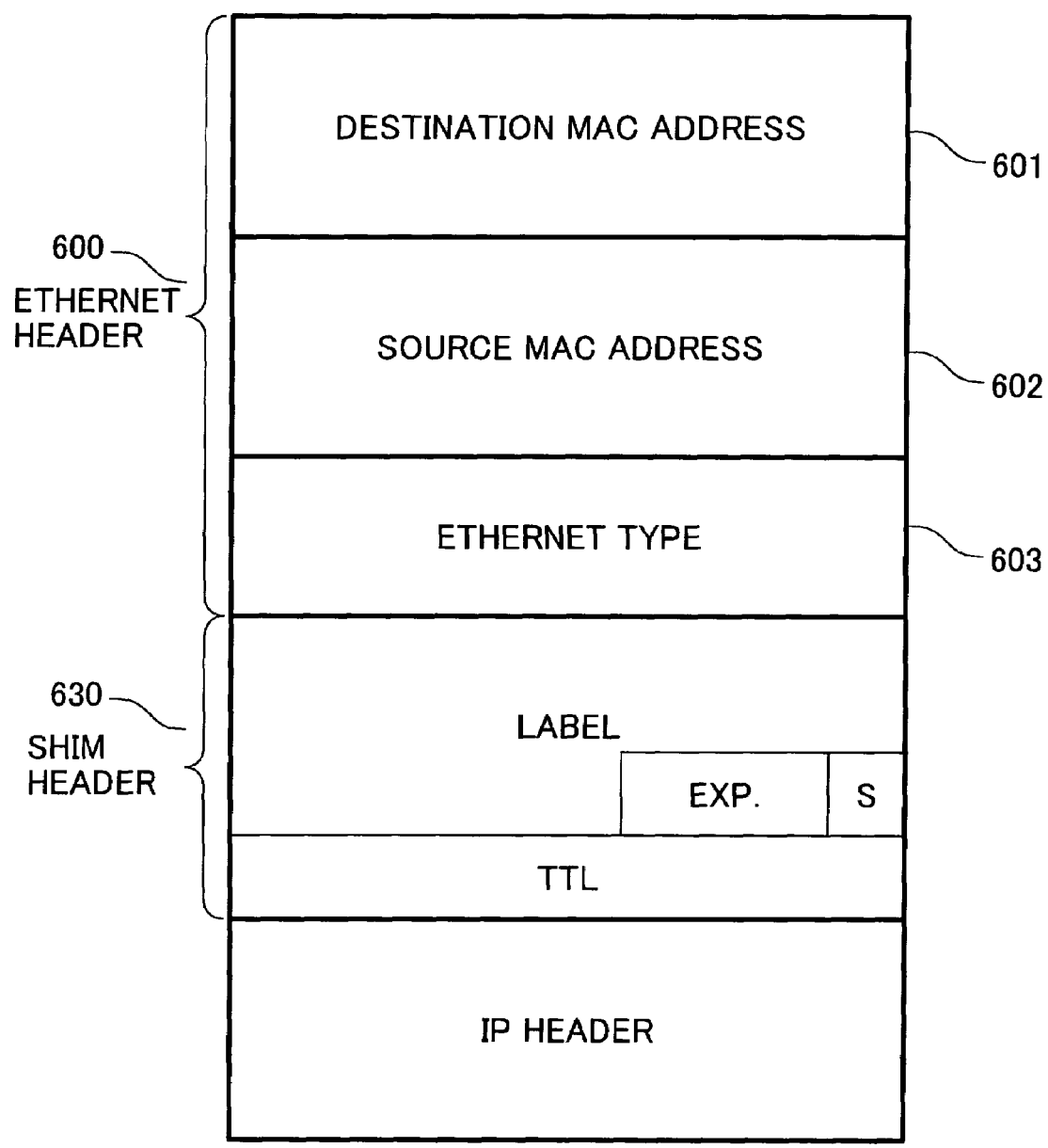
FIG. 15 is a view showing a frame format of MPLS using Ethernet.

FIG. 15 is a view showing a MPLS (Multi-Protocol Label Switching) packet format stipulated by IETF RFC3032. When a value 8847 of a hexadecimal digit has been set to the type field 603 of the Ethernet header 60, it can be recognized that a Shim header 630 has been set behind the Ethernet header 600.

Figure 16:
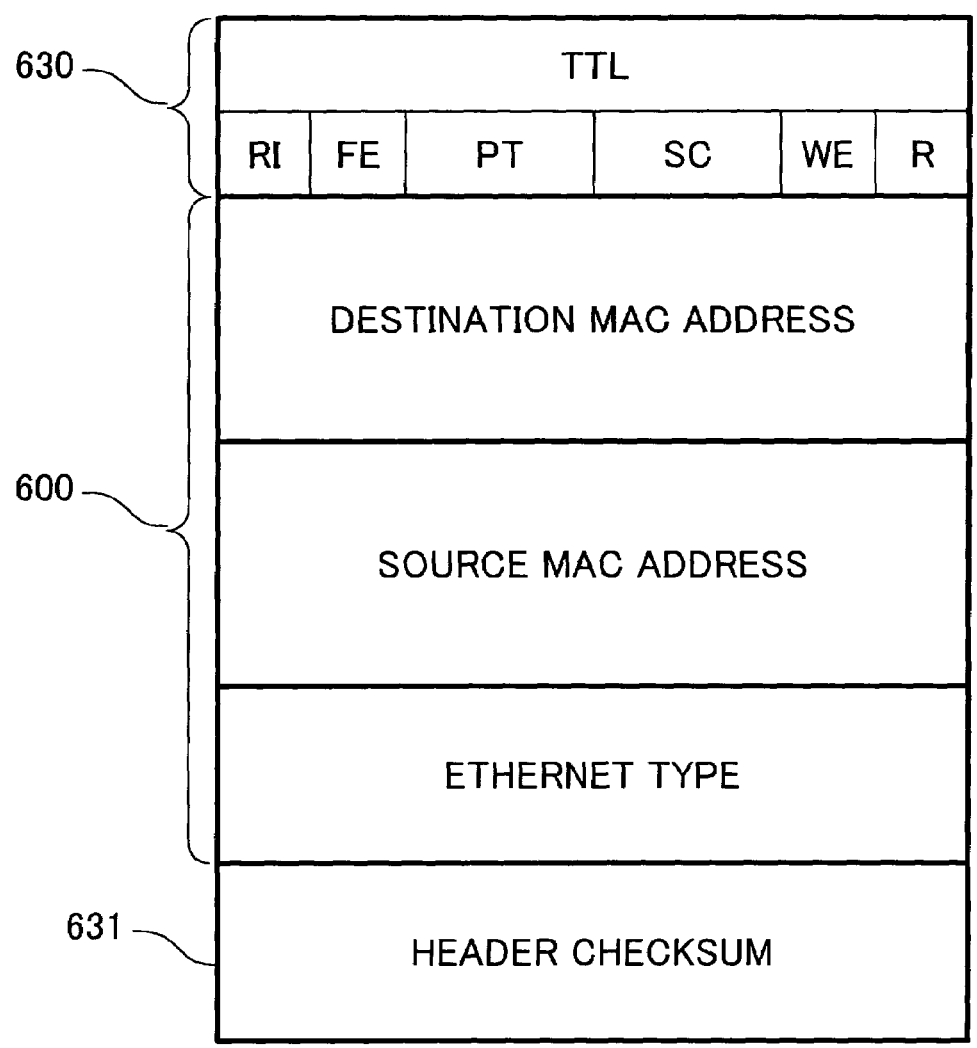
FIG. 16 is a view showing a header format of RPR.

FIG. 16 is a view showing a packet format of RPR (Resilient Packet Ring) that is being standardized by the IEEE802.17 committee. The packet of RPR is constructed of the RPR header 630, the Ethernet header 600 and the Header Checksum 631.

Next, the description will be made of an embodiment of the statistics information collecting processing in the apparatus of transmitting packets 1.

Figure 11:
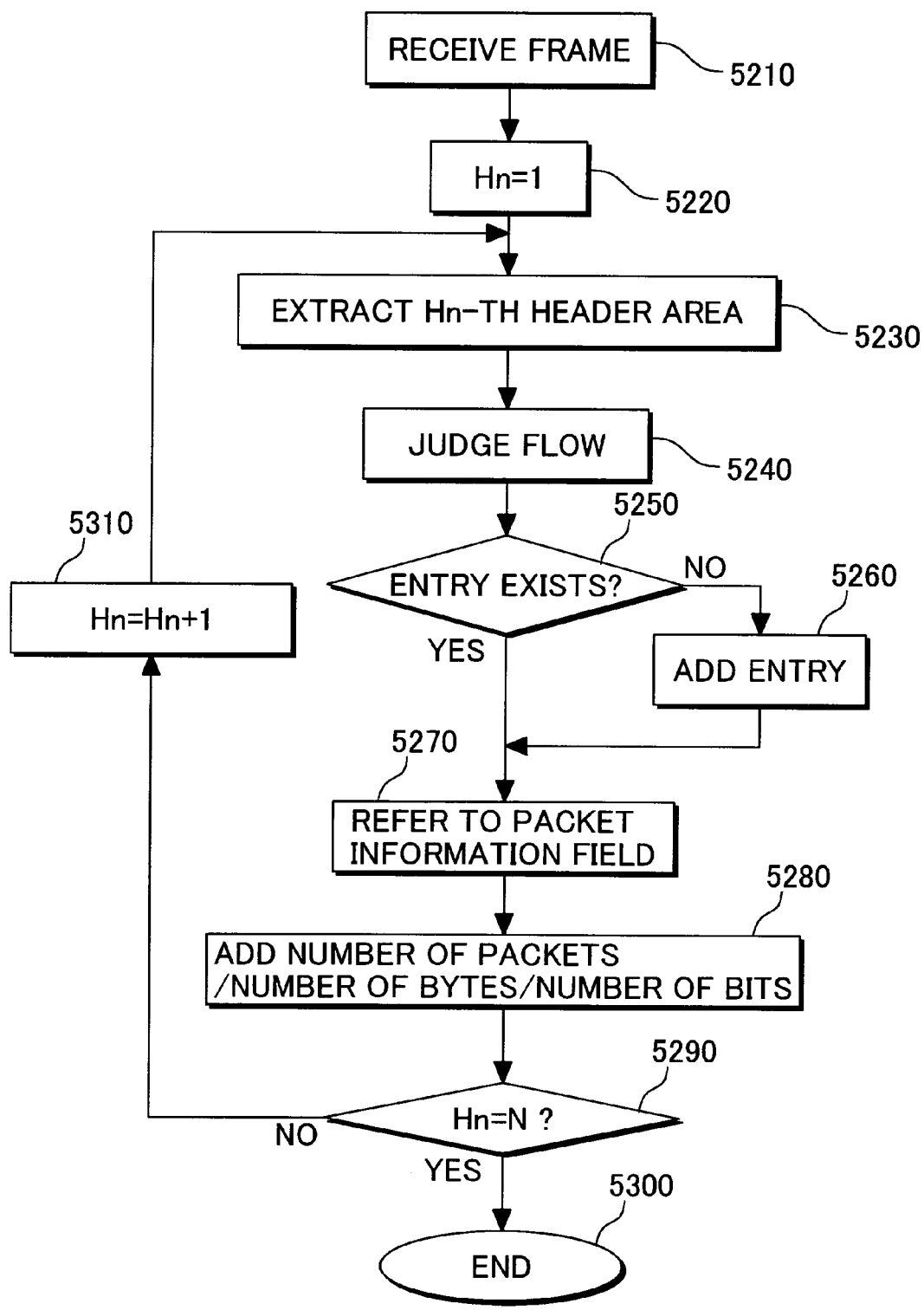
FIG. 11 is a flowchart showing an example of the procedure of collecting statistics information in the statistics information collecting processor of the apparatus of transmitting packets according to the present invention.

FIG. 11 is a flowchart showing an example of the statistics information collecting processing in the statistics information collecting processor 15.

With the reception (Step 5210) of the frame for header transfer 35 as a turning point, the statistics information collecting processor 15 starts the statistics information collecting processing. Next, the adder 153 of the statistics information collecting processor 15 sets the value Hn of a header number counter which the adder 153 holds to 1 (Step 5220) to next extract a header area 37-1 which is the first one from the head of the frame for header transfer 35 (Step 5230). Next, the header information is detected from the header area 37-1, whereby a flow of the packet to which the header has been imparted, for example, a pair of the source address and the destination address is judged (Step 5240). In this case, on the basis of packet input information 312 of the internal header 310 of the frame for header transfer 35, or a set point of the input port 371 set to the packet information processor 310, the statistics information collecting processor 15 is capable of identifying the type of the line which has received a packet to which the header area 37-1 has been imparted. Therefore, the statistics information collecting processor 15 is capable of grasping the header format of the header area 37-1. Next, in the Step 5240, it is judged whether or not there already exists, on the statistics table 154, an entry 1543 concerning the aforementioned flow judged (Step 5250), and if no entry of the flow exists on the statistics table 154, the entry will be newly added (Step 5260). Next, refer to the packet information processor 370 imparted to the head of the header area 37 (Step 5270). Thereby, a number of bytes of the packet will be judged from the value of the packet length 373 set to the packet information processor 370, and a number of bytes of the flow or a number of bits will be added in the adder 153. At the same time, the number of packets of the flow will be added (Step 5280). After the termination of these processing, it is judged whether or not the value Hn of the header number counter coincides with the number N of header information multiplexed into the frame 35 (Step 5290). If the value Hn of the header number counter coincides with N, the processing will be completed (Step 5300). If the value Hn of the header number counter does not coincide with N, the value Hn of the header number counter will be added by 1 (Step 5310) to return to the Step 5230. Thereafter, until the processing for the N-th header area 37-N is completed, the similar processing will be repeated.

Next, the description will be made of processing of renewing the search table 117 to be provided for the line card 11 by the statistics information collecting processor 15.

Figure 17:
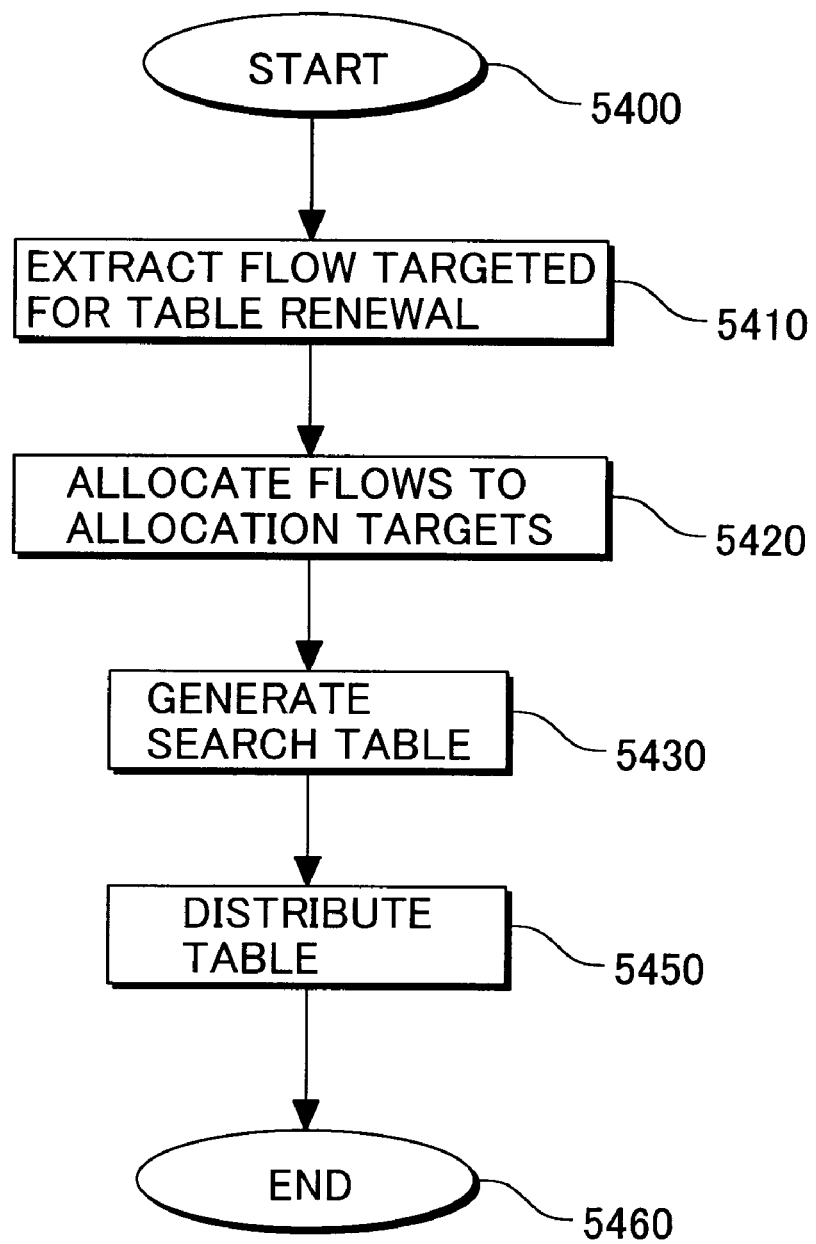
FIG. 17 is a flowchart showing an example of a renewal procedure of the search table in the statistics information collecting processor according to the present invention.

FIG. 17 is a flowchart showing an example of a search table renewal procedure in the statistics information collecting processor.

A processor 155 of the statistics information collecting processor 15 starts the analytical processing (Step 5410) to extract the flow targeted for table renewal from the statistics table 154 (Step 5410). Next, to a target to which the packet is allocated, that is, the extension function processors 14-1 to 14-m, flows obtained by extracting in the Step 5410 will be allocated (5420). Next, in accordance with allocation of flows for each packet allocation target determined in the Step 5420, a search table 117 will be generated (Step 5430). The statistics information collecting processor 15 will distribute the search table generated in the Step 5430 to the line card 11 (Step 5450). Thus, a series of processing will be completed (Step 5460).

Figure 23:
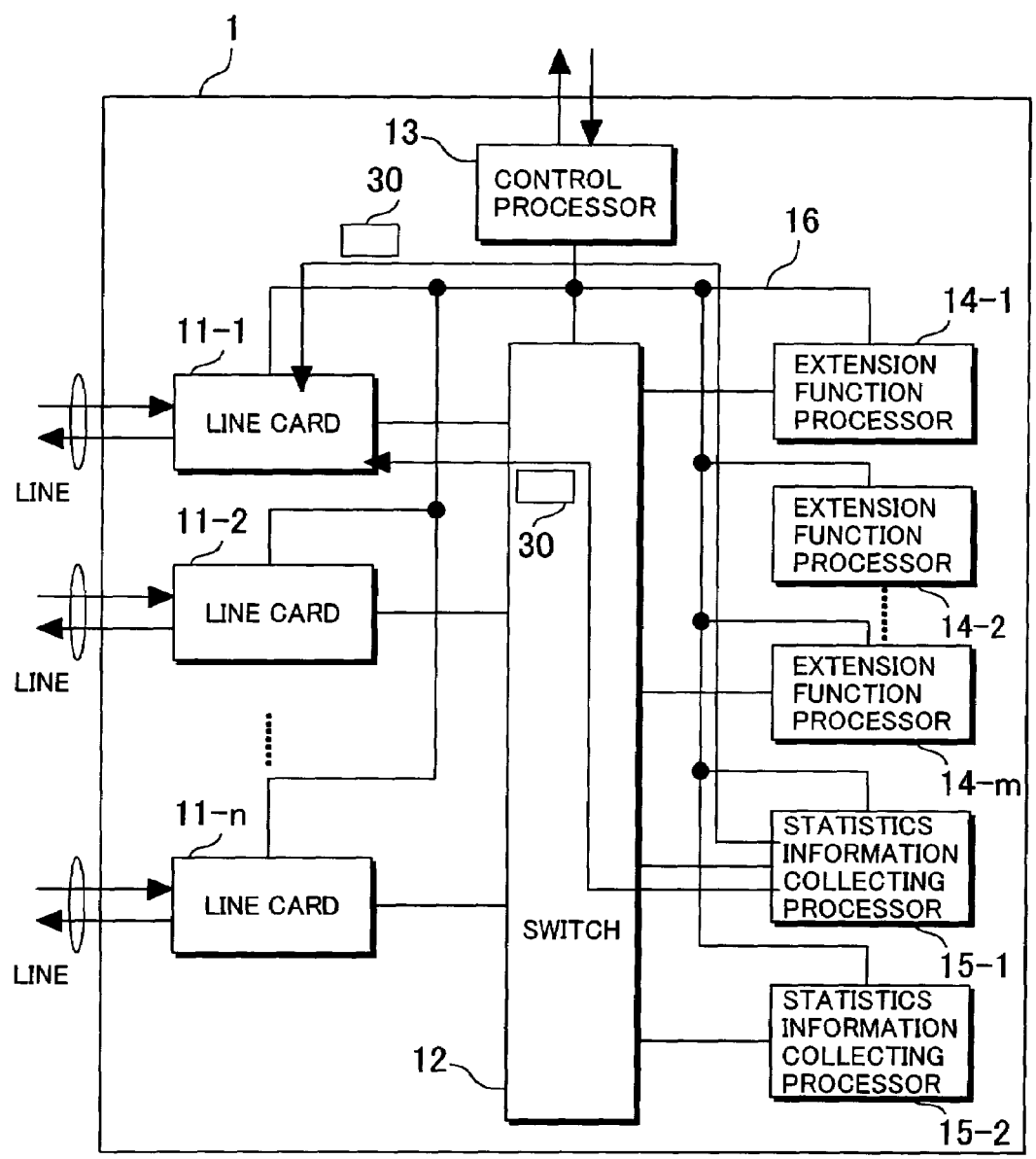
FIG. 23 is a view showing an example of a method of distributing a search table in an apparatus of transmitting packets according to the present invention.

The search table will be distributed to the line card 11 by the statistics information collecting processor 15 through the switch 12 or the internal bus 16 in accordance with the internal packet transfer format shown in FIG. 7 as shown in FIG. 23.

Figure 18:
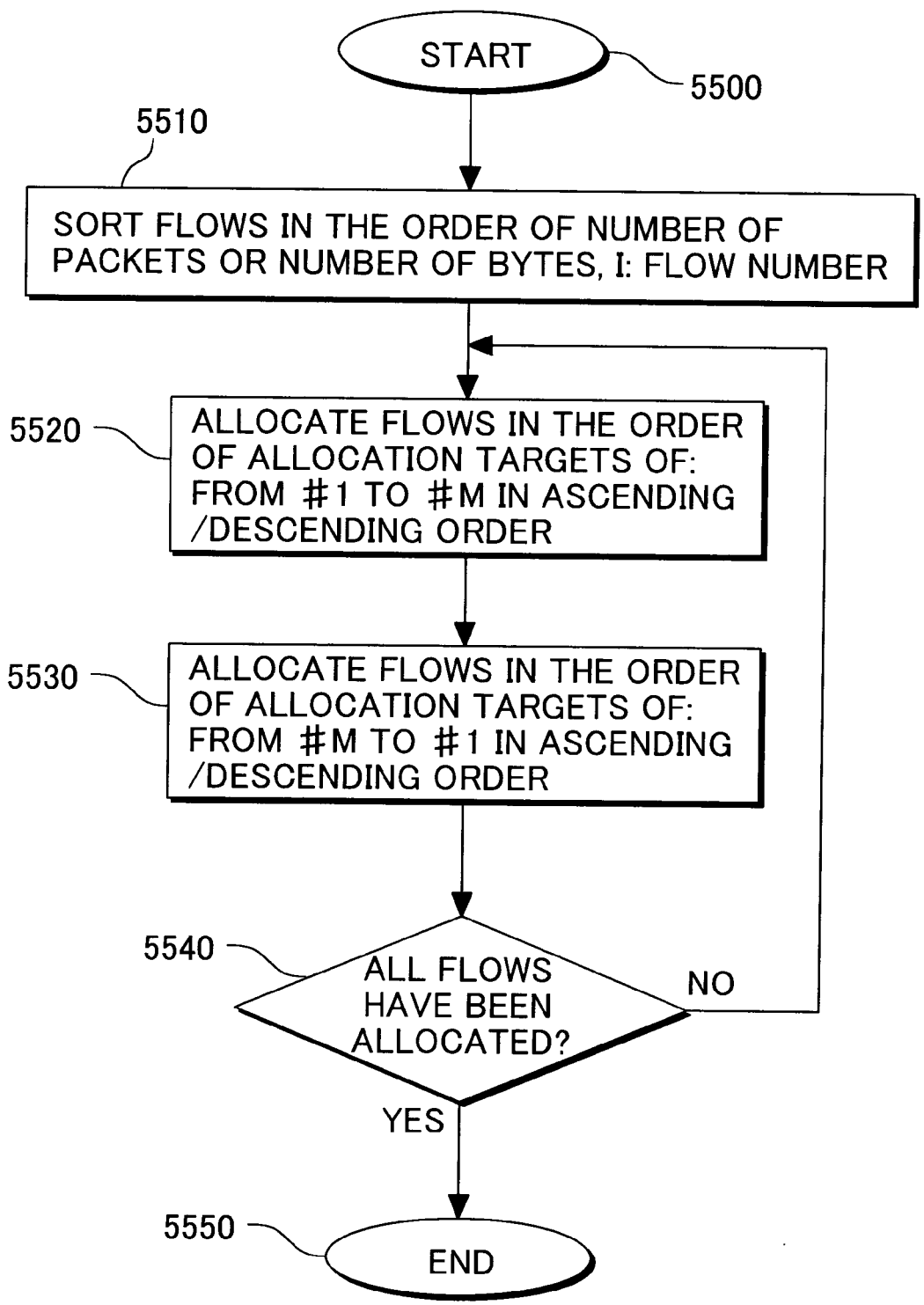
FIG. 18 is a flowchart showing an example of a procedure of determining an allocation target of load balancing in the statistics information collecting processor according to the present invention.

FIG. 18 shows an example of algorithm in which flows are allocated to respective allocation targets in the Step 5420 of FIG. 17.

The processor 155 sorts flows targeted for table renewal in the order of the number of packets or the number of bytes (Step 5510). Next, the processor 155 allocates the flows to the allocation targets one by one in ascending order or in descending order of the flows sorted in the Step 5510 (Step 5520). In this case, it is assumed that the extension function processors 14-1 to 14-m corresponds to the allocation target numbers 1 to m respectively, and that the flows are allocated in the order of: from an allocation target number 1 to an allocation target number m. When the allocation target numbers up to the allocation target number m are allocated, the flows will be next allocated one by one in ascending order or in descending order of the flows obtained by sorting in the Step 5510 to the allocation target numbers m to 1 (Step 5530). The allocation processing in the Step 5520 and the Step 5530 will be repeated until all the flows are allocated (Step 5540, Step 5550).

In this respect, in the description using the flowcharts of FIGS. 17 and 18, in the renewal processing of the search table, as the number of packets or the number of bytes for each flow for renewing the search table, there has been used the number of packets or the number of bytes which the apparatus for transmitting packets 1 has transmitted or received during a fixed time period, recorded on the statistics table shown in FIG. 5. As the number of packets or the number of bytes for each flow to be used for renewing the search table, it is also possible to use a predicted value for a number of packets or a number of bytes for each flow in future, calculated on the basis of the number of packets or the number of bytes for each flow which the apparatus for transmitting packets 1 collected in the past.

Figure 24:
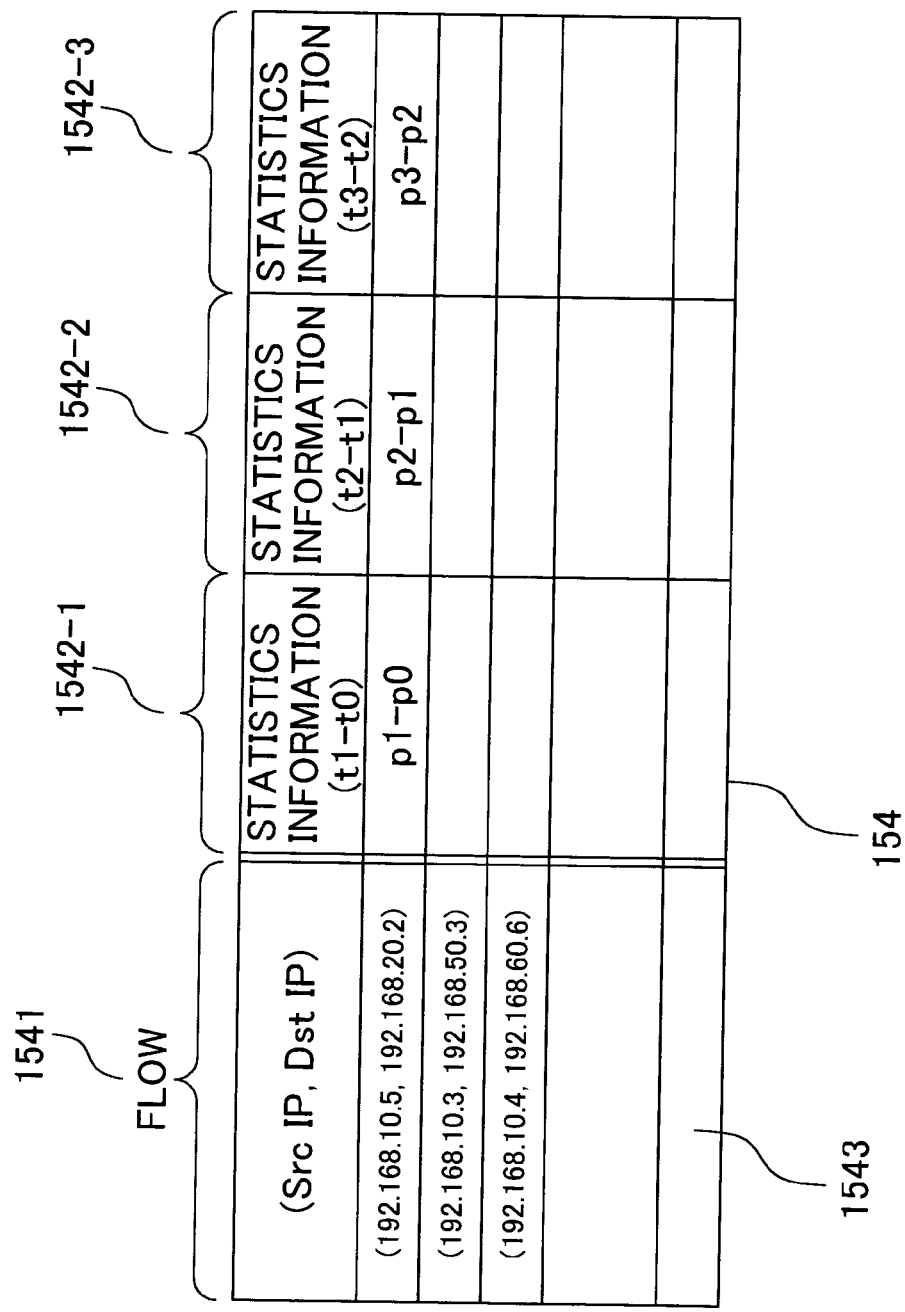
FIG. 24 is a view showing an example of the structure of the statistics table in an apparatus of transmitting packets according to the present invention.

FIG. 24 shows an example of the structure of the statistics table to be used for calculating a predicted value for the number of packets or the number of bytes for each flow in the future. The statistics table shown in FIG. 24 is constructed so as to record statistics information collected for each time period t1 to t0, time period t2 to t1 and time period t3 to t2 respectively like 1542-1, 1542-2 and 1542-3.

Figure 25:
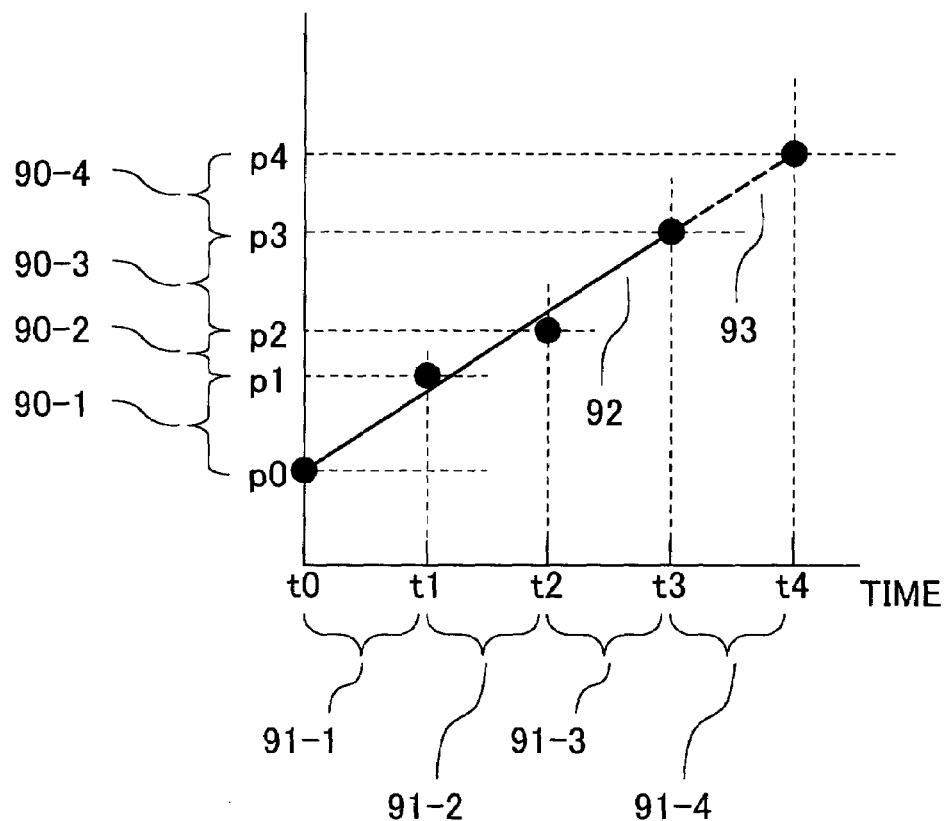
FIG. 25 is a view for explaining an example of a method of calculating a predicted value of a number of packets in the future in the apparatus of transmitting packets according to the present invention.

FIG. 25 is a view for explaining an example of a method of calculating a predicted value for the number of packets or the number of bytes for each flow in the future. Time t0 is a time when the collection of the statistics information has been started. Also, time t3 is the present time, and time t4 is a time when the table is scheduled to be renewed next. In the example of FIG. 25, during time t0 to t3, the number of packets of a flow (192, 168, 10.5, 192, 168 and 20.2) is monotonously increasing. In other words, this shows that the number of packets of a flow (192, 168, 10.5, 192, 168, and 20.2) which the apparatus of transmitting packets 1 has received during a time period (91-1) from time t0 to t1 is p1 to p0 (90-1), the number of packets of a flow (192, 168, 10.5, 192, 168, and 20.2) which the apparatus of transmitting packets 1 has received during a time period (91-2) from time t1 to t2 is p2 to p1 (90-2), and the number of packets of a flow (192, 168, 10.5, 192, 168, and 20.2) which the apparatus of transmitting packets 1 has received during a time period (91-3) from time t3 to t2 is p3 to p2 (90-3).

In this case, fluctuations in the number of packets during time t0 to t3 are approximated to a straight line 92. Further, there will be determined a straight line 93 obtained by extrapolating the aforementioned straight line 92 during time t3 to t4 (91-4). Thereby, it is possible to predict that the number of packets of a flow (192, 168, 10.5, 192, 168 and 20.2) during time t3 to t4 is p4 to p3 (90-4). Here, as a method for predicting the amount of packets, the amount of packets has been predicted by approximating a change in the number of packets in the past to a straight line to extrapolate the straight line to time t4, but when fluctuations in the amount of packets are more complicated, various approximate curves or prediction technique can be used to perform statistical prediction.

Also, of amounts of packets sampled at some time in the past, it can be arbitrarily determined whether an amount of packets collected at which time should be used as the data. For example, it may be possible to perform statistical prediction through the use of only data collected during time t0 to t2 without the aid of an amount of packets collected at the present time t3. For example, when an amount of packets counted at time t1 is extraordinarily large and is judged to be an abnormal value, it may be possible to predict an amount of packets at time t4 through the use of only data collected at time t0, t2 and t3. Further, it may be also possible to perform load balancing on the basis of only the amount of packets measured currently without performing the statistical prediction.

The description will be made of an advantage wherein the statistics information is collected by the statistics information collecting processor which is an independent functional processor.

The advantage wherein the statistics information collecting processor 15 is made into an independent processor is to reduce the apparatus cost. When performing normal packet transfer, the statistics information collecting processing is not always necessary in the apparatus of transferring packets. On the other hand, when performing high-functional processing such as load balancing, there arises the need to perform the statistics information collecting processing. In other words, in the apparatus of transmitting packets, it can be said that the statistics information collecting processing is an additional function. Therefore, the statistics information collecting processor is independently provided, whereby it becomes possible to provide the statistics information collecting processing only for the users who need, and to reduce the apparatus cost.

Further, when changing statistics information to be collected among others, only the statistics information collecting procedure is changed (change of software for control, replacement of functional module constituting the statistics information collecting processor, and the like), whereby it is possible to cope with.

In this respect, the apparatus of transmitting packets is provided with a plurality of statistics information collecting processors, and the same frame for header transfer is transferred from the line card to the plurality of statistics information collecting processors, whereby it is possible to make the statistics information collecting processor redundant, and to improve the processing capacity due to load balancing of the statistics information collecting processing and to improve the fault tolerance.

In the embodiments to this point, the description has been made of a method for renewing the search table 117 after the statistics information collecting processing in the apparatus of transmitting packets 1 is performed by the statistics information collecting processor 15.

Second Embodiment

It is also possible to renew the search table 117 after performing the collecting processing of statistics information in the line card 11, Hereinafter, the description will be made of an embodiment of a method of renewing the search table 117 after performing the collecting processing of statistics information in the line card 11.

The description will be made of a method of collecting statistics information in the line card 11.

Figure 19:
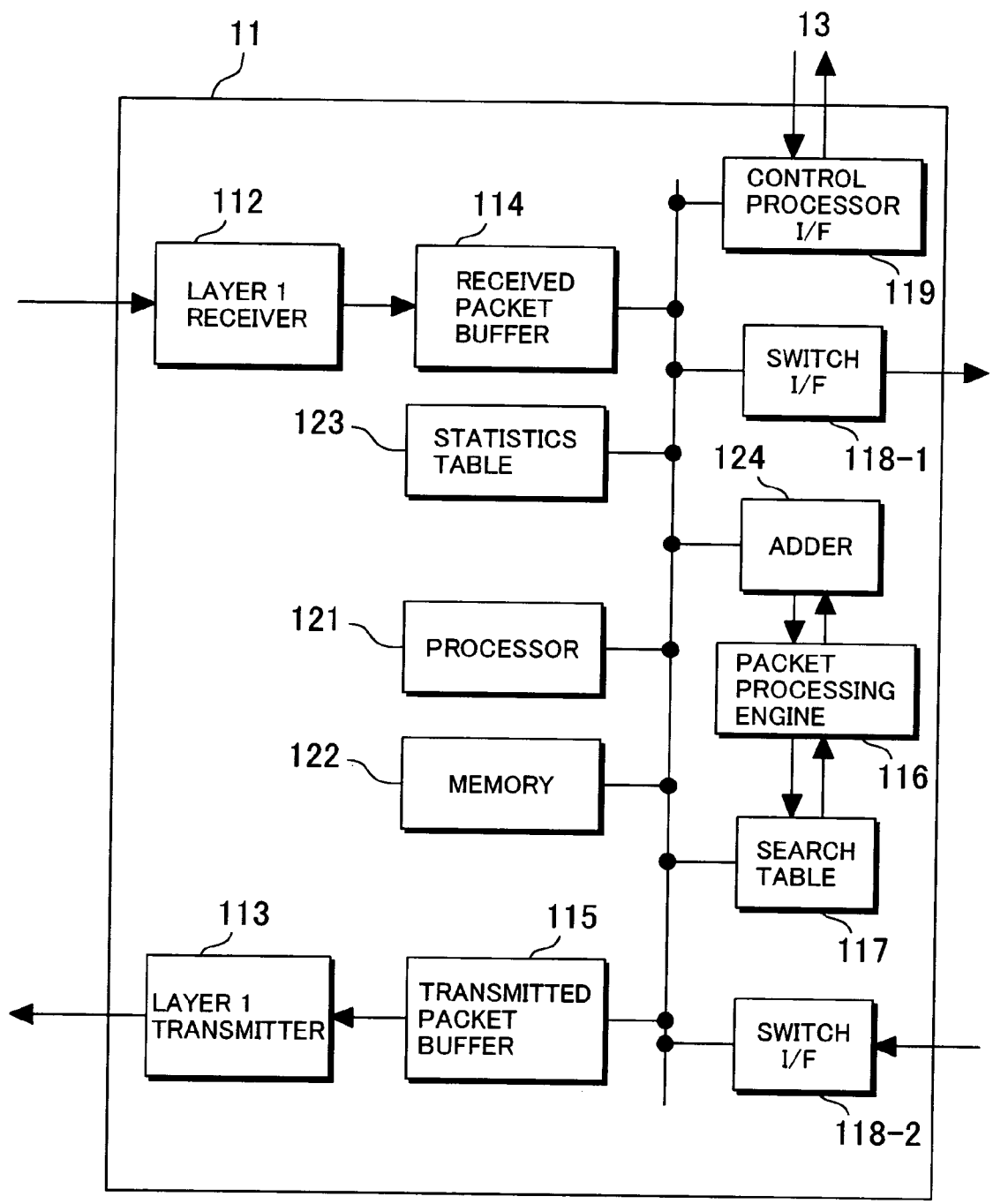
FIG. 19 is a view showing an example of the structure of the line card in an apparatus of transmitting packets according to the present invention.

FIG. 19 is a view showing an example of the structure for collecting statistics information in the line card 11. A packet processing engine 116 reads out flow information to be collected from the header area of a received packet. Also, although not shown, the packet processing engine 116 is equipped with a packet counter, and has both a function for analyzing header information and a function for counting an amount of packets. Also, it counts the byte length and bit length of the received packet. An adder 124 holds a register for adding a number of packets, a number of bytes and a number of bits for each flow that the packet processing engine 116 extracts. The number of packets, the number of bytes and the number of bits that have been written on the register of the adder 124 are written every a fixed time period on a statistics table 123 having the same format as the statistics table 154 shown in FIG. 5, provided at the statistics information collecting processor 15.

The renewal processing of the search table may be performed by the line card 11. Also, the renewal processing of the search table maybe performed by the control processor 13 by transferring the statistics information collected by the line card 11 to the control processor 13.

When performing the renewal processing of the search table in the line card 11, the processor 121 performs the processing in accordance with the procedure of the flowcharts shown in FIGS. 17 and 18.

When the renewal processing of the search table is performed by the line card, since the processing is performed within the line card 11, the allocation target of the load balancing will be renewed with only the flow of the packet received by the same line card as the target.

When the renewal processing of the search table is performed by the control processor 13, as in the case of performing the renewal processing of the search table in the aforementioned statistics information collecting processor, the allocation target of load balancing will be renewed with flows of all the packets received by the apparatus of transmitting packets 1 as the targets.

When the renewal processing of the search table is performed by the control processor 13, the control processor 13 reads out the statistics table 123 of the line card 11 through the internal bus 16 every a fixed time period, for example, every 15 minutes, whereby the statistics information collected by each line card will be summarized.

Figure 20:
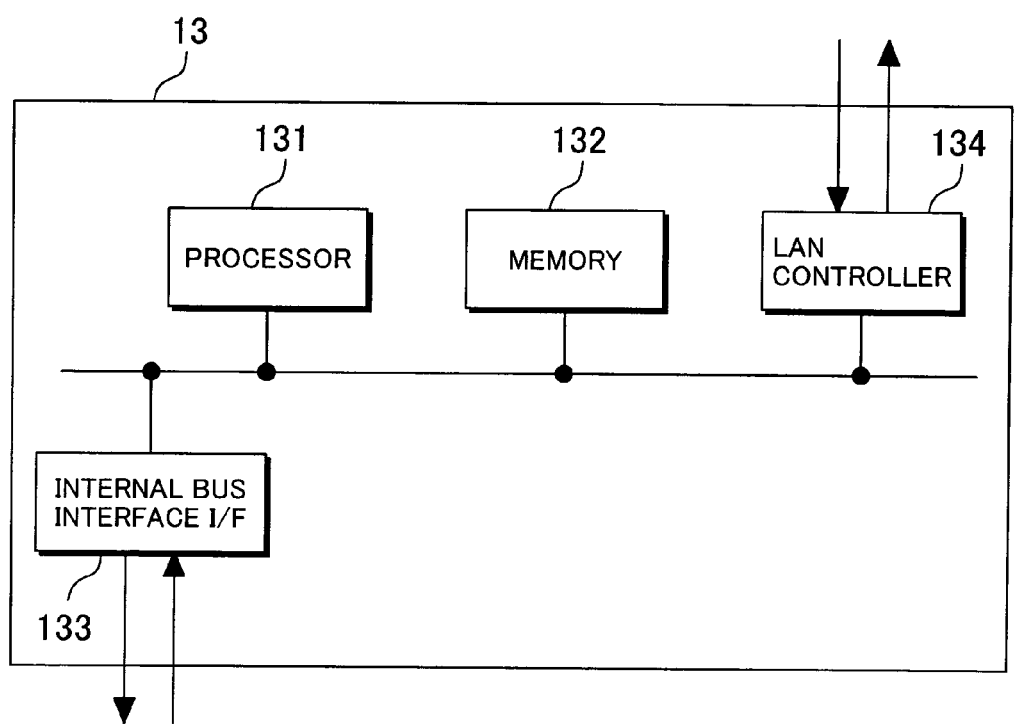
FIG. 20 is a view showing an example of the structure of a control processor in an apparatus of transmitting packets according to the present invention.

FIG. 20 is a view showing an example of the structure of the control processor 13. The control processor 13 is constructed of: a processor 131; a memory 132; an internal bus interface 133, which is an interface with the internal bus 16; and a LAN controller 134, which is an interface with the control device of the apparatus of transmitting packets 1.

The processor 131 of the control processor 13 generates, on the memory 132, a table for integrating the statistics information transferred from each line card 11. The processor 131 performs the processing similar to the procedure of the flowchart of FIG. 17 on the basis of the table generated on the aforementioned memory 132 to thereby renew the content of the search table 117 of the line card 11. The control processor 13 performs the processing similar to the method of transferring the table from the aforementioned statistics information collecting processor 15 to the line card 11 to thereby transfer the content of the search table 117 renewed to the line card 11.

What is claimed is:

1. An apparatus for transmitting packets, comprising:
   a plurality of line cards which have interfaces for transmitting and receiving packets;
   switches connected to said plurality of line cards;
   a plurality of extension function processors connected to said switches, the extension function processors performing processing to be executed on a higher layer than a layer on which a received packet is transferred; and
   a statistic information collecting processor connected to said switches, said statistic information collecting processor including means for analyzing header information imparted to said packets for each flow, and means for counting an amount of packets for each flow to be transmitted or received through said interfaces,
   wherein said statistic information collecting processor predicts the amount of packets for each flow to be received by said plurality of interfaces from said header information and said amount of packets for each flow which have been analyzed, and
   wherein on the basis of said predicted amount of packets for each flow received by all of the line cards, an extension function processor to which the packets for each flow are transmitted is selected from the extension function processors and implements processing on the packets so as to allocate to each extension function processor uniformly an amount of traffic that is processed in each extension function processor.

2. The apparatus for transmitting packets according to claim 1, further comprising a bus for directly connecting said interfaces and said statistic information collecting processor.

3. The apparatus for transmitting packets according to claim 1, wherein said interfaces for transmitting and receiving packets have means for storing, in a frame, at least a portion of plural headers imparted to a plurality of packets which said interfaces transmit and receive, and means for transmitting the frame to the statistic information collecting processor.

4. The apparatus for transmitting packets according to claim 3, wherein the headers stored in said frame are multiplexed into said frame and are all equal to one another in size.

5. The apparatus for transmitting packets according to claim 3, further comprising means for multiplexing into said frame the headers stored in said frame, wherein said means for multiplexing determines the length of each header portion to be extracted from a plurality of packets in response to information indicating classification of said packets which have been set to headers to be imparted to each of said packets to multiplex into one frame.

6. The apparatus for transmitting packets according to claim 1, further comprising a plurality of said statistic information collecting processors.

7. The apparatus for transmitting packets according to claim 1, further comprising a table provided in each of said line cards, on which a relationship of a correspondence between header information of the received packets and an output line card of the packet is described, and
   a statistics table provided in said statistic information collecting processor, on which is described a relationship of a correspondence between header information of the received packets and said amount of packets for each flow.

8. The apparatus for transmitting packets according to claim 7, further comprising means for renewing said table provided on each of said line cards on the basis of said amount of packets predicted for each flow.

9. A method for transmitting packets to be used in an apparatus of transmitting packets having a plurality of line cards, each of which has interfaces for transmitting and receiving packets and means for processing packets, the apparatus of transmitting packets further having a plurality of extension function processors connected to said switches, the extension function processors performing processing to be executed on a higher layer than a layer on which a received packet is transferred, comprising the steps of:
   receiving packets through said interfaces;
   counting a number of said packets for each flow received by each of said interfaces;
   predicting a number of packets for each flow to arrive at each of said plurality of interfaces in the future on the basis of said number of packets counted for each flow; and
   selecting, from the extension function processors, an extension function processor to which the received packet is transmitted on the basis of said predicted number of packets for each flow, the extension function processor implementing processing on said packets so as to allocate to each extension function processor uniformly an amount of traffic that is processed in each extension function processor.

10. The method for transmitting packets according to claim 9, further comprising a step of multiplexing header information of a plurality of said received packets into a frame, and
    a step of transmitting the frame to the means for processing packets.

11. The method for transmitting packets according to claim 10, further comprising a step of extracting only a portion of said headers corresponding to a fixed length from said received packets.

12. The method for transmitting packets according to claim 10, further comprising a step of extracting a header of said received packet only by a size corresponding to information indicating classification of said packet set to a header to be imparted to each of said packets.

* * * * *